United States Patent
Deering et al.

(10) Patent No.: US 6,982,719 B2
(45) Date of Patent: Jan. 3, 2006

(54) SWITCHING SAMPLE BUFFER CONTEXT IN RESPONSE TO SAMPLE REQUESTS FOR REAL-TIME SAMPLE FILTERING AND VIDEO GENERATION

(75) Inventors: Michael F. Deering, Los Altos, CA (US); Nathaniel David Naegle, Pleasanton, CA (US); Michael G. Lavelle, Saratoga, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 503 days.

(21) Appl. No.: 10/195,827

(22) Filed: Jul. 15, 2002

(65) Prior Publication Data

US 2004/0008204 A1    Jan. 15, 2004

(51) Int. Cl.
*G09G 5/399* (2006.01)
(52) U.S. Cl. .................. 345/539; 345/502; 345/544
(58) Field of Classification Search .............. 345/582, 345/424, 506, 611, 503, 536, 539, 501, 502, 345/505, 544, 545; 382/299, 260, 266, 274; 382/ 702/190

See application file for complete search history.

(56) References Cited

U.S. PATENT DOCUMENTS

| 6,424,343 | B1 |   | 7/2002 | Deering et al. |
| 6,738,533 | B1 | * | 5/2004 | Shum et al. ................. 382/299 |
| 6,756,989 | B1 | * | 6/2004 | Morgan et al. ............. 345/582 |

* cited by examiner

*Primary Examiner*—Kee M. Tung
*Assistant Examiner*—Dalip K. Singh
(74) *Attorney, Agent, or Firm*—Meyertons Hood Kivlin Kowert & Goetzel, P.C.; Jeffrey C. Hood

(57) ABSTRACT

A graphics system configured with a scheduling network, a sample buffer, a rendering engine and a filtering engine. The rendering engine is configured to generate samples in response to received graphics data, and to forward the samples to the scheduling network for storage in the sample buffer. The filtering engine is configured to send a request for samples to the scheduling network. The scheduling network is configured to compare a video set designation of the request to a previous request designation, to update one or more state registers in one or more memory devices of the sample buffer in response to a determination that the video set designation of the request is different from the previous request designation, and to assert signals inducing a transfer of a collection of samples corresponding to the request from the one or more memory devices to the filtering engine.

18 Claims, 17 Drawing Sheets

SWITCHING SAMPLE BUFFER CONTEXT IN RESPONSE TO SAMPLE REQUESTS FOR REAL-TIME SAMPLE FILTERING AND VIDEO GENERATION

BACKGROUND OF THE INVENTION

1. Field of the Invention

This invention relates generally to the field of computer graphics and, more particularly, to a graphics system configured to dynamically switch the context of a sample buffer memory to support the real-time generation of video pixels.

2. Description of the Related Art

A computer system typically relies upon its graphics system for producing visual output on a computer screen or display device. Early graphics systems were only responsible for taking what the processor produced as output and displaying it on the screen. In essence, they acted as simple translators or interfaces. Modem graphics systems, however, incorporate graphics processors with a great deal of processing power. The graphics systems now act more like coprocessors rather than simple translators. This change is due to the recent increase in both the complexity and amount of data being sent to the display device. For example, modem computer displays have many more pixels, greater color depth, and are able to display images with higher refresh rates than earlier models. Similarly, the images displayed are now more complex and may involve advanced rendering and visual techniques such as anti-aliasing and texture mapping.

As a result, without considerable processing power in the graphics system, the computer's system CPU would spend a great deal of time performing graphics calculations. This could rob the computer system of the processing power needed for performing other tasks associated with program execution and thereby dramatically reduce overall system performance. With a powerful graphics system, however, when the CPU is instructed to draw a box on the screen, the CPU is freed from having to compute the position and color of each pixel. Instead, the CPU may send a request to the video card stating: "draw a box at these coordinates". The graphics system then draws the box, freeing the CPU to perform other tasks.

Generally, a graphics system in a computer (also referred to as a graphics system) is a type of video adapter that contains its own processor to boost performance levels. These processors are specialized for computing graphical transformations, so they tend to achieve better results than the general-purpose CPU used by the computer system. In addition, they free up the computer's CPU to execute other commands while the graphics system is handling graphics computations. The popularity of graphical applications, and especially multimedia applications, has made high performance graphics systems a common feature of computer systems. Most computer manufacturers now bundle a high performance graphics system with their systems.

Since graphics systems typically perform only a limited set of functions, they may be customized and therefore far more efficient at graphics operations than the computer's general-purpose microprocessor. While early graphics systems were limited to performing two-dimensional (2D) graphics, their functionality has increased to support three-dimensional (3D) wire-frame graphics, 3D solids, and now includes support for textures and special effects such as advanced shading, fogging, alpha-blending, and specular highlighting.

The rendering ability of 3D graphics systems has been improving at a breakneck pace. A few years ago, shaded images of simple objects could only be rendered at a few frames per second, but today's systems support rendering of complex objects at 60 Hz or higher. At this rate of increase, in the not too distant future, graphics systems will literally be able to render more pixels in "real-time" than a single human's visual system can perceive. While this extra performance may be useable in multiple-viewer environments, it may be wasted in the more common single-viewer environments. Thus, a graphics system is desired which is capable of utilizing the increased graphics processing power to generate images that are more realistic.

While the number of pixels and frame rate is important in determining graphics system performance, another factor of equal or greater importance is the visual quality of the image generated. For example, an image with a high pixel density may still appear unrealistic if edges within the image are too sharp or jagged (also referred to as "aliased"). One well-known technique to overcome these problems is anti-aliasing. Anti-aliasing involves smoothing the edges of objects by shading pixels along the borders of graphical elements. More specifically, anti-aliasing entails removing higher frequency components from an image before they cause disturbing visual artifacts. For example, anti-aliasing may soften or smooth high contrast edges in an image by forcing certain pixels to intermediate values (e.g., around the silhouette of a bright object superimposed against a dark background).

Another visual effect used to increase the realism of computer images is alpha blending. Alpha blending is a technique that controls the transparency of an object, allowing realistic rendering of translucent surfaces such as water or glass. Another effect used to improve realism is fogging. Fogging obscures an object as it moves away from the viewer. Simple fogging is a special case of alpha blending in which the degree of alpha changes with distance so that the object appears to vanish into a haze as the object moves away from the viewer. This simple fogging may also be referred to as "depth cueing" or atmospheric attenuation, i.e., lowering the contrast of an object so that it appears less prominent as it recedes. More complex types of fogging go beyond a simple linear function to provide more complex relationships between the level of translucence and an object's distance from the viewer. Current state of the art software systems go even further by utilizing atmospheric models to provide low-lying fog with improved realism.

While the techniques listed above may dramatically improve the appearance of computer graphics images, they also have certain limitations. In particular, they may introduce their own aberrations and are typically limited by the density of pixels displayed on the display device.

As a result, a graphics system is desired which is capable of utilizing increased performance levels to increase not only the number of pixels rendered but also the quality of the image rendered. In addition, a graphics system is desired which is capable of utilizing increases in processing power to improve the results of graphics effects such as anti-aliasing.

Prior art graphics systems have generally fallen short of these goals. Prior art graphics systems use a conventional frame buffer for refreshing pixel/video data on the display. The frame buffer stores rows and columns of pixels that exactly correspond to respective row and column locations on the display. Prior art graphics system render 2D and/or 3D images or objects into the frame buffer in pixel form, and then read the pixels from the frame buffer during a screen refresh to refresh the display. Thus, the frame buffer stores the output pixels that are provided to the display. To reduce visual artifacts that may be created by refreshing the screen at the same time the frame buffer is being updated, most graphics systems' frame buffers are double-buffered.

To obtain images that are more realistic, some prior art graphics systems have gone further by generating more than one sample per pixel. As used herein, the term "sample" refers to calculated color information that indicates the color, depth (z), and potentially other information, of a particular point on an object or image. For example, a sample may comprise the following component values: a red value, a green value, a blue value, a z value, and an alpha value (e.g., representing the transparency of the sample). A sample may also comprise other information, e.g., a z-depth value, a blur value, an intensity value, brighter-than-bright information, and an indicator that the sample consists partially or completely of control information rather than color information (i.e., "sample control information"). By calculating more samples than pixels (i.e., super-sampling), a more detailed image is calculated than can be displayed on the display device. For example, a graphics system may calculate four samples for each pixel to be output to the display device. After the samples are calculated, they are then combined or filtered to form the pixels that are stored in the frame buffer and then conveyed to the display device. Using pixels formed in this manner may create a more realistic final image because overly abrupt changes in the image may be smoothed by the filtering process.

These prior art super-sampling systems typically generate a number of samples that are far greater than the number of pixel locations on the display. These prior art systems typically have rendering processors that calculate the samples and store them into a render buffer. Filtering hardware then reads the samples from the render buffer, filters the samples to create pixels, and then stores the pixels in a traditional frame buffer. The traditional frame buffer is typically double-buffered, with one side being used for refreshing the display device while the other side is updated by the filtering hardware. Once the samples have been filtered, the resulting pixels are stored in a traditional frame buffer that is used to refresh to display device. These systems, however, have generally suffered from limitations imposed by the conventional frame buffer and by the added latency caused by the render buffer and filtering. Therefore, an improved graphics system is desired which includes the benefits of pixel super-sampling while avoiding the drawbacks of the conventional frame buffer.

Memory devices are reaching a level of complexity where they may be programmed to operate on input data and/or output data in a programmably determined fashion. 3DRAMs or 3DRAM64s are exemplary of such devices. Because of their flexibility, graphics designers are encouraged to incorporate them into graphics systems. Each process writing to the memory devices or reading from the memory devices may require different types of behavior from the memory devices. Thus, there exists a need for a graphics system and method which can control the switching of context information for one or more input processes and/or output processes.

SUMMARY

In one set of embodiments, a graphics system may be configured with a scheduling network, a sample buffer, a rendering engine and a filtering engine. The rendering engine may be configured to generate samples in response to received graphics data, and to forward the samples to the scheduling network for storage in the sample buffer. The filtering engine may be configured to send a request for samples to the scheduling network. The scheduling network may be configured to compare a video set designation of the request to a previous request designation, to update one or more state registers in one or more memory devices of the sample buffer in response to a determination that the video set designation of the request is different from the previous request designation, and to assert signals inducing a transfer of a collection of samples corresponding to the request from the one or more memory devices to the filtering engine. The filtering engine operates on the samples to produce pixel values.

BRIEF DESCRIPTION OF THE DRAWINGS

A better understanding of the present invention can be obtained when the following detailed description is considered in conjunction with the following drawings, in which.

Figure 1:
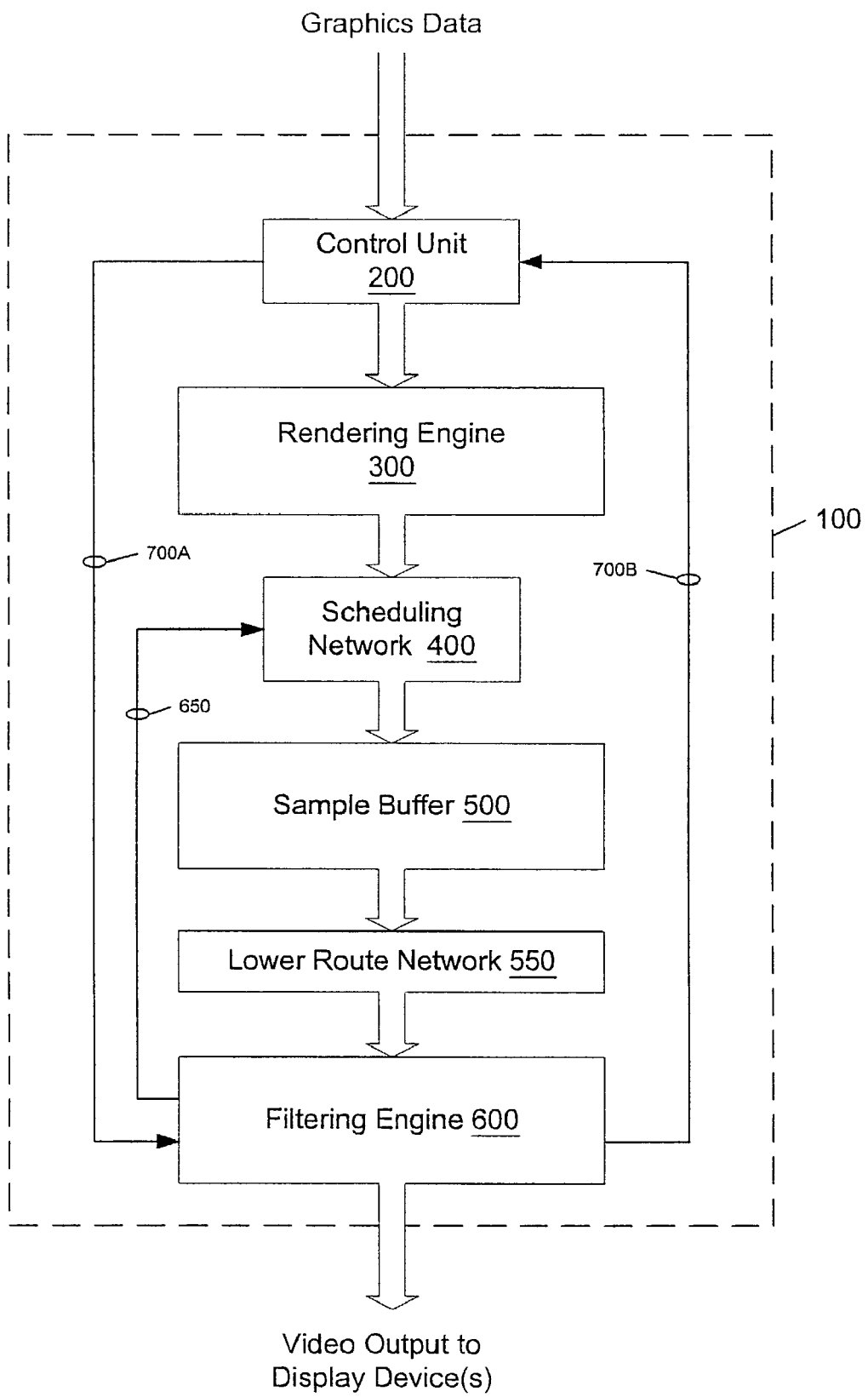
FIG. 1 illustrates one set of embodiments of a graphics accelerator configured to perform graphical computations.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "connected" means "directly or indirectly connected", and the term "coupled" means "directly or indirectly connected".

DETAILED DESCRIPTION OF THE PREFERRED EMBODIMENTS

FIG. 1 illustrates one set of embodiments of a graphics accelerator 100 configured to perform graphics computations (especially 3D graphics computations). Graphics accelerator 100 may include a control unit 200, a rendering engine 300, a scheduling network 400, a sample buffer 500, a lower route network 550, and a filtering engine 600.

Figure 2:
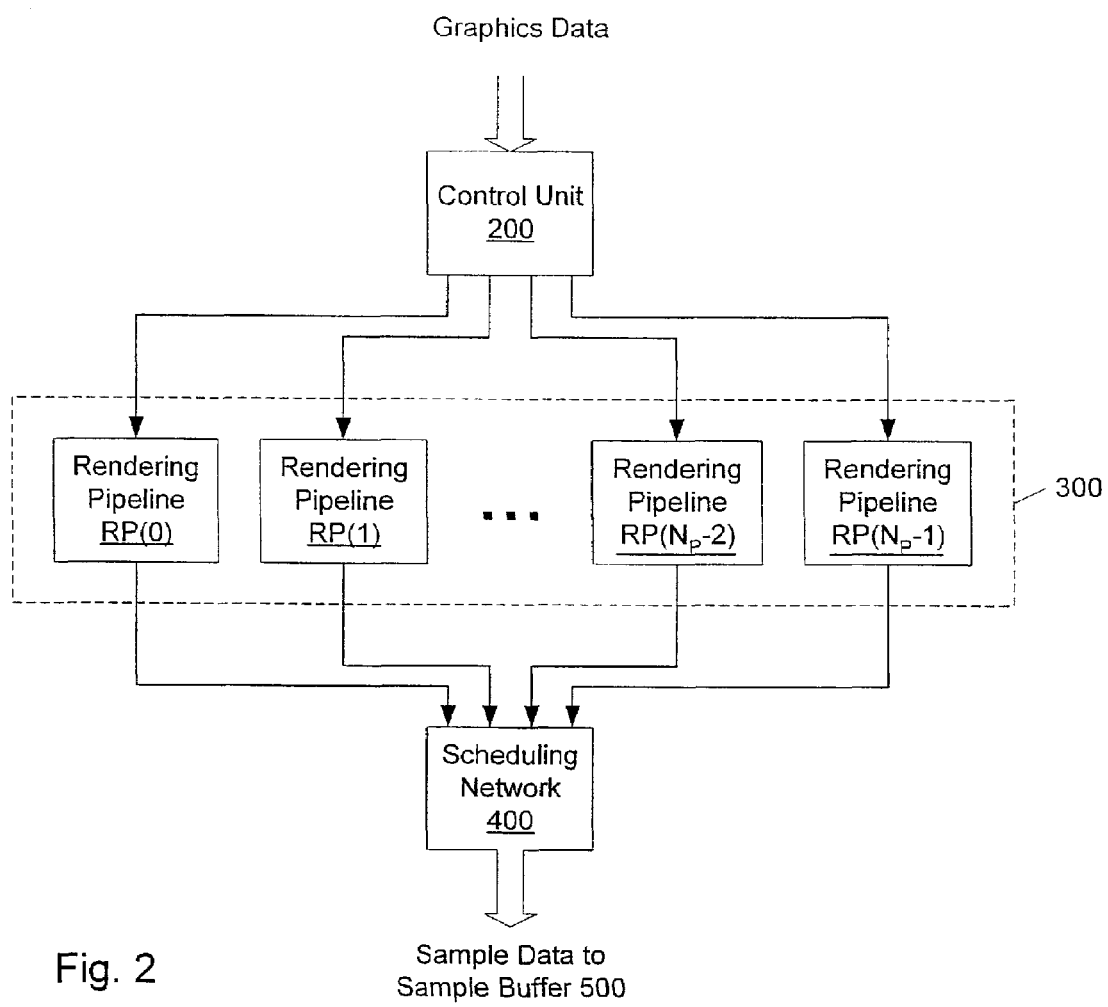
FIG. 2 illustrates one set of embodiments of a parallel rendering engine.

The rendering engine 300 may include a set of $N_{PL}$ rendering pipelines as suggested by FIG. 2, where $N_{PL}$ is a positive integer. The rendering pipelines, denoted as RP(0) through RP($N_{PL}$-1), are configured to operate in parallel. For example, in one embodiment, $N_{PL}$ equals four. In another embodiment, $N_{PL}$=8.

The control unit 200 receives a stream of graphics data from an external source (e.g. from the system memory of a host computer), and controls the distribution of the graphics data to the rendering pipelines. The control unit 200 may divide the graphics data stream into $N_{PL}$ substreams, which flow to the $N_{PL}$ rendering pipelines respectively. The control unit 200 may implement an automatic load-balancing scheme so the host application need not concern itself with load balancing among the multiple rendering pipelines.

The stream of graphics data received by the control unit 200 may correspond to a frame of a 3D animation. The frame may include a number of 3D objects. Each object may be described by a set of primitives such as polygons (e.g. triangles), lines, polylines, dots, etc. Thus, the graphics data stream may contain information defining a set of primitives.

Polygons are naturally described in terms of their vertices. Thus, the graphics data stream may include a stream of vertex instructions. A vertex instruction may specify a position vector (X, Y, Z) for a vertex. The vertex instruction may also include one or more of a color vector, a normal vector and a vector of texture coordinates. The vertex instructions may also include connectivity information, which allows the rendering engine 300 to assemble the vertices into polygons (e.g. triangles).

Each rendering pipeline RP(K) of the rendering engine 300 may receive a corresponding stream of graphics data from the control unit 200, and performs rendering computations on the primitives defined by the graphics data stream. The rendering computations generate samples, which are written into sample buffer 500 through the scheduling network 400.

The filtering engine 600 is configured to read samples from the sample buffer 500, to perform a filtering operation on the samples resulting in the generation of a video pixel stream, and, to convert the video pixel stream into an analog video signal. The analog video signal may be supplied to one or more video output ports for display on one or more display devices (such as computer monitors, projectors, head-mounted displays and televisions).

Furthermore, the graphics system 100 may be configured to generate up to $N_D$ independent video pixel streams denoted VPS(0), VPS(1), . . . , VPS($N_D$-1), where $N_D$ is a positive integer. Thus, a set of host applications (running on a host computer) may send $N_D$ graphics data streams denoted GDS(0), GDS(1), . . . , GDS($N_D$-1) to the graphics system 100. The rendering engine 300 may perform rendering computations on each graphics data stream GDS(I), for I=0, 1, 2, . . . , $N_D$-1, resulting in sample updates to a corresponding region SBR(I) of the sample buffer 500. The filtering engine 600 may operate on the samples from each sample buffer region SBR(I) to generate the corresponding video pixel stream VPS(I). The filtering engine 600 may convert each video pixel stream VPS(I) into a corresponding analog video signal AVS(I). The $N_D$ analog video signals may be supplied to a set of video output ports for display on a corresponding set of display devices. In one embodiment, $N_D$ equals two. In another embodiment, $N_D$ equals four.

The filtering engine 600 may send sample data requests to the scheduling network 400 through a request bus 650. In response to the sample data requests, scheduling network 400 may assert control signals, which invoke the transfer of the requested samples (or bursts of samples) to the filtering engine 600.

In various embodiments, the sample buffer 500 includes a plurality of memory units, and the filtering engine 600 includes a plurality of filtering units. The filtering units interface may interface with the lower router network 550 to provide data select signals. The lower route network 550 may use the data select signals to steer data from the memory units to the filtering units.

The control unit 200 may couple to the filtering engine 600 through a communication bus 700, which includes an outgoing segment 700A and a return segment 700B. The outgoing segment 700A may be used to download parameters (e.g. lookup table values) to the filtering engine 600. The return segment 700B may be used as a readback path for the video pixels generated by filtering engine 600. Video pixels transferred to control unit 200 through the return segment 700B may be forwarded to system memory (i.e. the system memory of a host computer), or perhaps, to memory (e.g. texture memory) residing on graphics system 100 or on another graphics accelerator.

The control unit 200 may include direct memory access (DMA) circuitry. The DMA circuitry may be used to facilitate (a) the transfer of graphics data from system memory to the control unit 200, and/or, (b) the transfer of video pixels (received from the filtering engine 600 through the return segment 700B) to any of various destinations (such as the system memory of the host computer).

Figure 3:
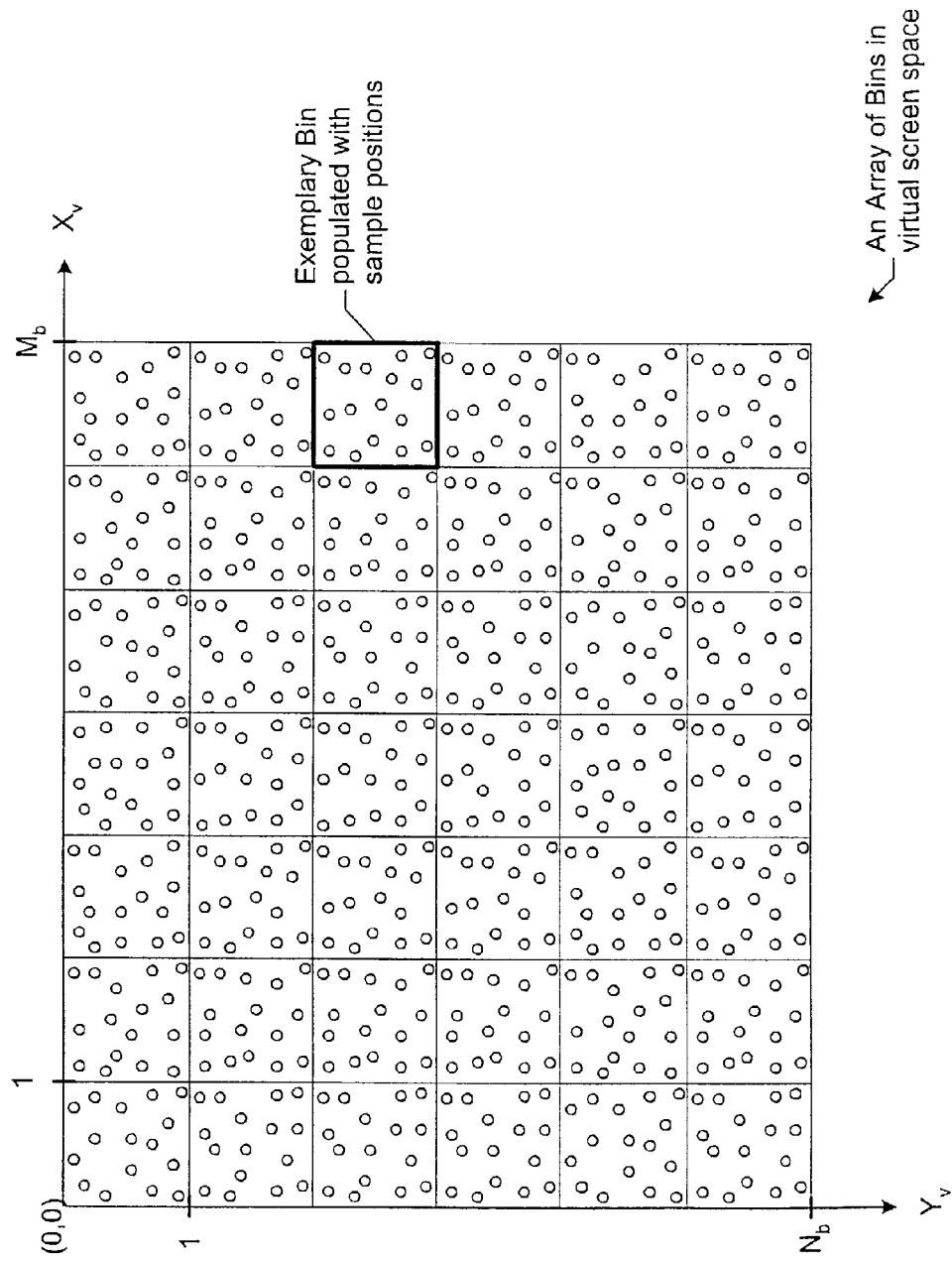
FIG. 3 illustrates an array of spatial bins each populated with a set of sample positions in a two-dimension virtual screen space.

The rendering pipelines of the rendering engine 300 may compute samples for the primitives defined by the received graphics data stream(s). The computation of samples may be organized according to an array of spatial bins as suggested by FIG. 3. The array of spatial bins defines a rectangular window in a virtual screen space. The spatial bin array may have dimension $M_B \times N_B$, i.e., may comprise $M_B$ bins horizontally and $N_B$ bins vertically.

Each spatial bin may be populated with a number of sample positions. Sample positions are denoted as small circles. Each sample position may be defined by a horizontal offset and a vertical offset with respect to the origin of the bin in which it resides. The origin of a bin may be at its top-left corner. Note that any of a variety of other positions on the boundary or in the interior of a bin may serve as its origin. A sample may be computed at each of the sample positions. A sample may include a color vector, and other values such as z depth and transparency (i.e. an alpha value).

The sample buffer 500 may organize the storage of samples according to memory bins. Each memory bin corresponds to one of the spatial bins, and stores the samples for the sample positions in a corresponding spatial bin.

If a rendering pipeline RP(k) determines that a spatial bin intersects with a given primitive (e.g. triangle), the rendering pipeline may:

(a) generate $N_{s/b}$ sample positions in the spatial bin;
(b) determine which of the $N_{s/b}$ sample positions reside interior to the primitive;
(c) compute a sample for each of the interior sample positions, and
(d) forward the computed samples to the scheduling network 400 for transfer to the sample buffer 500.

The computation of a sample at a given sample position may involve computing sample components such as red, green, blue, z, and alpha at the sample position. Each sample component may be computed based on a spatial interpolation of the corresponding components at the vertices of the primitive. For example, a sample's red component may be computed based on a spatial interpolation of the red components at the vertices of the primitive.

In addition, if the primitive is to be textured, one or more texture values may be computed for the intersecting bin. The final color components of a sample may be determined by combining the sample's interpolated color components and the one or more texture values.

Each rendering pipeline RP(K) may include dedicated circuitry for determining if a spatial bin intersects a given primitive, for performing steps (a), (b) and (c), for computing the one or more texture values, and for applying the one or more texture values to the samples.

Each rendering pipeline RP(K) may include programmable registers for the bin array size parameters $M_B$ and $N_B$ and the sample density parameter $N_{s/b}$. In one embodiment, $N_{s/b}$ may take values in the range from 1 to 16 inclusive.

Sample Rendering Methodology

Figure 4:
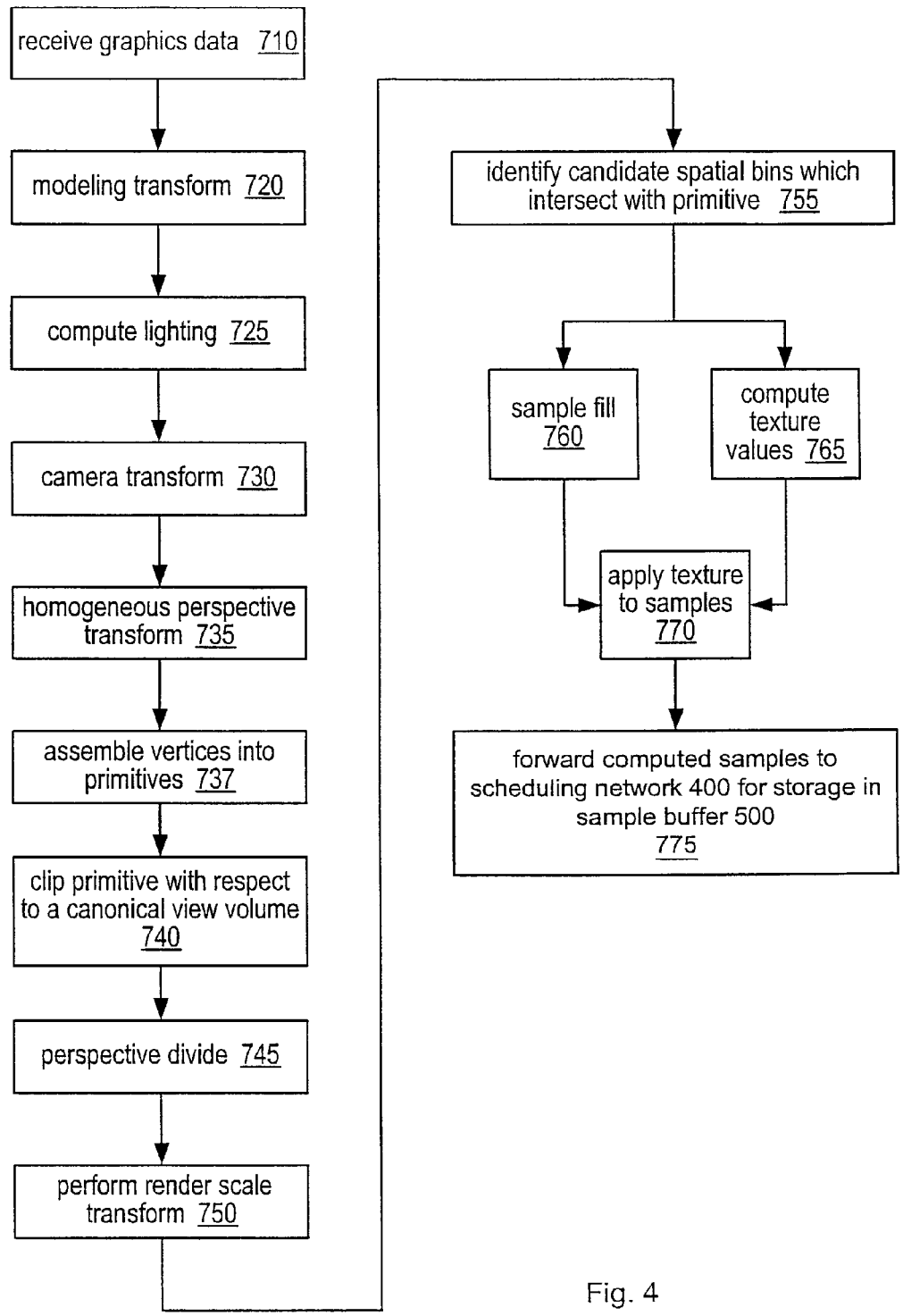
FIG. 4 illustrates one set of embodiments of a rendering methodology which may be used to generate samples in response to received stream of graphics data.

FIG. 4 illustrates one set of embodiments of a rendering process implemented by each rendering pipeline RP(K) of the $N_{PL}$ rendering pipelines.

In step 710, rendering pipeline RP(K) receives a stream of graphics data from the control unit 200 (e.g. stores the graphics data in an input buffer).

The graphics data may have been compressed according to any of a variety of data compression and/or geometry compression techniques. Thus, the rendering pipeline RP(K) may decompress the graphics data to recover a stream of vertices.

In step 720, the rendering pipeline RP(K) may perform a modeling transformation on the stream of vertices. The modeling transformation serves to inject objects into a world coordinate system. The modeling transformation may also include the transformation of any normal vectors associated with the stream vertices. The matrix used to perform the modeling transformation is dynamically programmable by host software.

In step 725, rendering engine 300 may subject the stream vertices to a lighting computation. Lighting intensity values (e.g. color intensity values) may be computed for the ver tices of polygonal primitives based on one or more of the following:

(1) the vertex normals;
(2) the position and orientation of a virtual camera in the world coordinate system;
(3) the intensity, position, orientation and type-classification of light sources; and
(4) the material properties of the polygonal primitives such as their intrinsic color values, ambient, diffuse, and/or specular reflection coefficients.

The vertex normals (or changes in normals from one vertex to the next) may be provided as part of the graphics data stream. The rendering pipeline RP(K) may implement any of a wide variety of lighting models. The position and orientation of the virtual camera are dynamically adjustable. Furthermore, the intensity, position, orientation and type-classification of light sources are dynamically adjustable.

It is noted that separate virtual camera positions may be maintained for the viewer's left and right eyes in order to support stereo video. For example, rendering pipeline RP(K) may alternate between the left camera position and the right camera position from one animation frame to the next.

In step 730, the rendering pipeline RP(K) may perform a camera transformation on the vertices of the primitive. The camera transformation may be interpreted as providing the coordinates of the vertices with respect to a camera coordinate system, which is rigidly bound to the virtual camera in the world space. Thus, the camera transformation may require updating whenever the camera position and/or orientation change. The virtual camera position and/or orientation may be controlled by user actions such as manipulations of an input device (such as a joystick, data glove, mouse, light pen, and/or keyboard). In some embodiments, the virtual camera position and/or orientation may be controlled based on measurements of a user's head position and/or orientation and/or eye orientation(s).

In step 735, the rendering pipeline RP(K) may perform a homogenous perspective transformation to map primitives from the camera coordinate system into a clipping space, which is more convenient for a subsequent clipping computation. In some embodiments, steps 730 and 735 may be combined into a single transformation.

In step 737, rendering pipeline RP(K) may assemble the vertices to form primitives such as triangles, lines, etc.

In step 740, rendering pipeline RP(K) may perform a clipping computation on each primitive. In clipping space, the vertices of primitives may be represented as 4-tuples (X, Y, Z, W). In some embodiments, the clipping computation may be implemented by performing a series of inequality tests as follows:

$T1=(-W \leq X)$
$T2=(X \leq W)$
$T3=(-W \leq Y)$
$T4=(Y \leq W)$
$T5=(-W \leq Z)$
$T6=(Z \leq 0)$ If all the test flags are true, a vertex resides inside the canonical view volume. If any of the test flags are false, the vertex is outside the canonical view volume. An edge between vertices A and B is inside the canonical view volume if both vertices are inside the canonical view volume. An edge can be trivially rejected if the expression Tk(A) OR Tk(B) is false for any k in the range from one to six. Otherwise, the edge requires testing to determine if it partially intersects the canonical view volume, and if so, to determine the points of intersection of the edge with the clipping planes. A primitive may thus be cut down to one or more interior sub-primitives (i.e. subprimitives that lie inside the canonical view volume). The rendering pipeline RP(K) may compute color intensity values for the new vertices generated by clipping.

Note that the example given above for performing the clipping computation is not meant to be limiting. Other methods may be used for performing the clipping computation.

In step 745, rendering pipeline RP(K) may perform a perspective divide computation on the homogenous post-clipping vertices (X, Y, Z, W) according to the relations x=X/W
y=Y/W
z=Z/W.

After the perspective divide, the x and y coordinates of each vertex (x, y, z) may reside in a viewport rectangle, for example, a viewport square defined by the inequalities $-1 \leq x \leq 1$ and $-1 \leq y \leq 1$.

In step 750, the rendering pipeline RP(K) may perform a render scale transformation on the post-clipping primitives. The render scale transformation may operate on the x and y coordinates of vertices, and may have the effect of mapping the viewport square in perspective-divided space onto (or into) the spatial bin array in virtual screen space, i.e., onto (or into) a rectangle whose width equals the array horizontal bin resolution $M_B$ and whose height equals the array vertical bin resolution $N_B$. Let $X_V$ and $Y_V$ denote the horizontal and vertical coordinate respectively in the virtual screen space.

Figure 5:
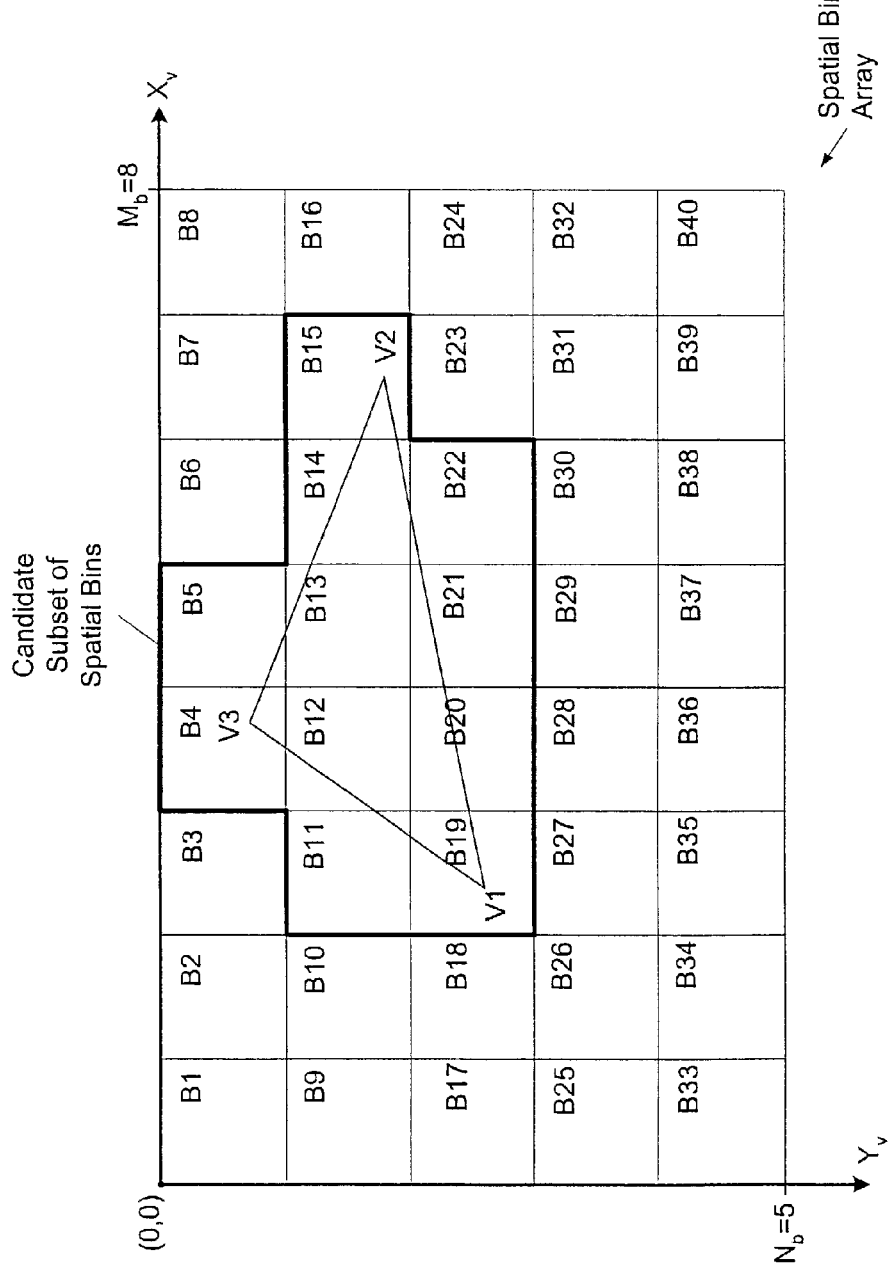
FIG. 5 illustrates a set of candidate bins which intersect a particular triangle.

In step 755, the rendering pipeline RP(K) may identify spatial bins which geometrically intersect with the post-scaling primitive as suggested by FIG. 5. Bins in this subset are referred to as "candidate" bins or "intersecting" bins. It is noted that values $M_B=8$ and $N_B=5$ for the dimensions of the spatial bin array have been chosen for sake of illustration, and are much smaller than would typically be used in most applications of graphics system 100.

Figure 6:
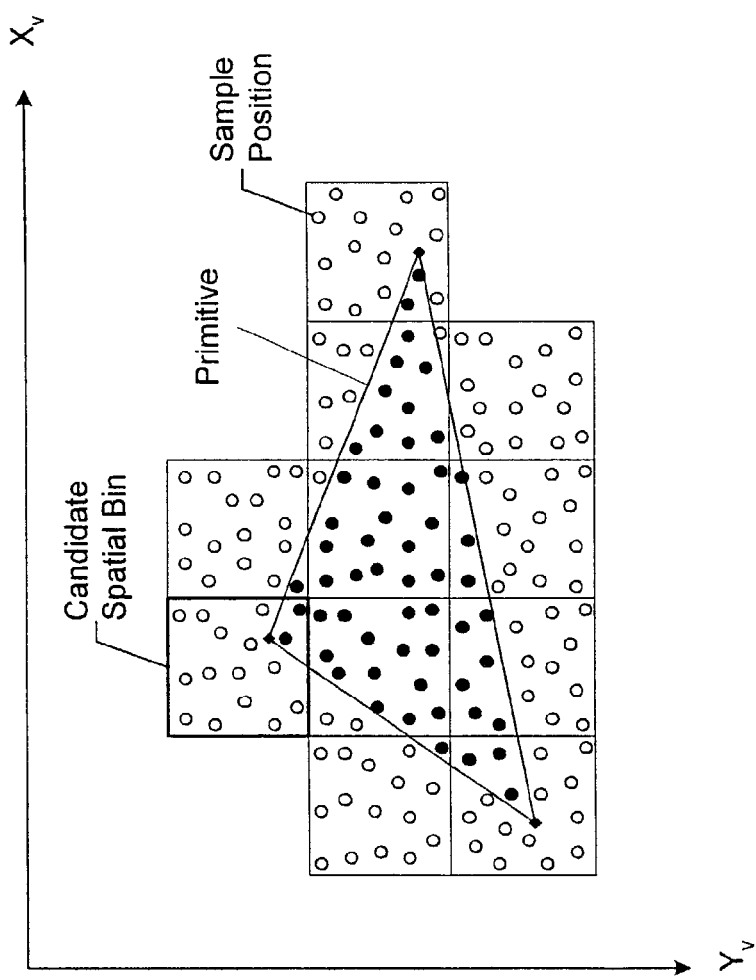
FIG. 6 illustrates the identification of sample positions in the candidate bins which fall interior to the triangle.

In step 760, the rendering pipeline RP(K) performs a "sample fill" operation on candidate bins identified in step 755 as suggested by FIG. 6. In the sample fill operation, the rendering pipeline RP(K) populates candidate bins with sample positions, identifies which of the sample positions reside interior to the primitive, and computes sample values (such as red, green, blue, z and alpha) at each of the interior sample positions. The rendering pipeline RP(K) may include a plurality of sample fill units to parallelize the sample fill computation. For example, two sample fill units may perform the sample fill operation in parallel on two candidate bins respectively. (This N=2 example generalizes to any number of parallel sample fill units). In FIG. 6, interior sample positions are denoted as small black dots, and exterior sample positions are denoted as small circles.

Figure 7:
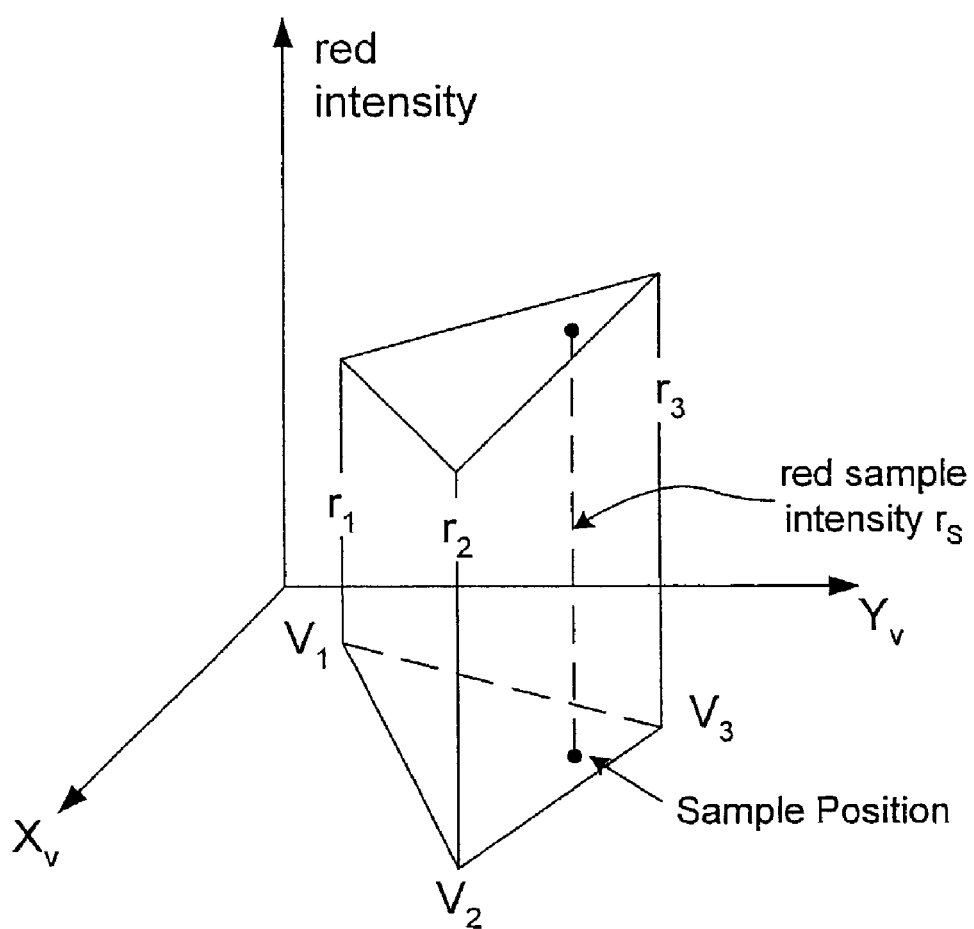
FIG. 7 illustrates the computation of a red sample component based on a spatial interpolation of the red components at the vertices of the containing triangle.

The rendering pipeline RP(K) may compute the color components (r, g, b) for each interior sample position in a candidate bin based on a spatial interpolation of the corresponding vertex color components as suggested by FIG. 7. FIG. 7 suggests a linear interpolation of a red intensity value $r_S$ for a sample position inside the triangle defined by the vertices V1, V2, and V3 in virtual screen space (i.e. the horizontal plane of the figure). The red color intensity is shown as the up-down coordinate. Each vertex Vk has a corresponding red intensity value $r_k$. Similar interpolations may be performed to determine green, blue, z and alpha values.

In step 765, rendering pipeline RP(K) may compute a vector of texture values for each candidate bin. The rendering pipeline RP(K) may couple to a corresponding texture memory TM(K). The texture memory TM(K) may be used to store one or more layers of texture information. Rendering pipeline RP(K) may use texture coordinates associated with a candidate bin to read texels from the texture memory TM(K). The texels may be filtered to generate the vector of texture values. The rendering pipeline RP(K) may include a plurality of texture filtering units to parallelize the computation of texture values for one or more candidate bins.

The rendering pipeline RP(K) may include a sample fill pipeline which implements step 760 and a texture pipeline which implements step 765. The sample fill pipeline and the texture pipeline may be configured for parallel operation. The sample fill pipeline may perform the sample fill operations on one or more candidate bins while the texture fill pipeline computes the texture values for the one or more candidate bins.

In step 770, the rendering pipeline RP(K) may apply the one or more texture values corresponding to each candidate bin to the color vectors of the interior samples in the candidate bin. Any of a variety of methods may be used to apply the texture values to the sample color vectors.

In step 775, the rendering pipeline RP(K) may forward the computed samples to the scheduling network 400 for storage in the sample buffer 500.

The sample buffer 500 may be configured to support double-buffered operation. The sample buffer may be logically partitioned into two buffer segments A and B. The rendering engine 300 may write into buffer segment A while the filtering engine 600 reads from buffer segment B. At the end of a frame of animation, a host application (running on a host computer) may assert a buffer swap command. In response to the buffer swap command, control of buffer segment A may be transferred to the filtering engine 600, and control of buffer segment B may be transferred to rendering engine 300. Thus, the rendering engine 300 may start writing samples into buffer segment B, and the filtering engine 600 may start reading samples from buffer segment A.

It is noted that usage of the term "double-buffered" does not necessarily imply that all components of samples are double-buffered in the sample buffer 500. For example, sample color may be double-buffered while other components such as z depth may be single-buffered.

In some embodiments, the sample buffer 500 may be triple-buffered or N-fold buffered, where N is greater than two.

Filtration of Samples to Determine Pixels

Filtering engine 600 may access samples from a buffer segment (A or B) of the sample buffer 500, and generate video pixels from the samples. Each buffer segment of sample buffer 500 may be configured to store an $M_B \times N_B$ array of bins. Each bin may store $N_{s/b}$ samples. The values $M_B$, $N_B$ and $N_{s/b}$ are programmable parameters.

Figure 8:
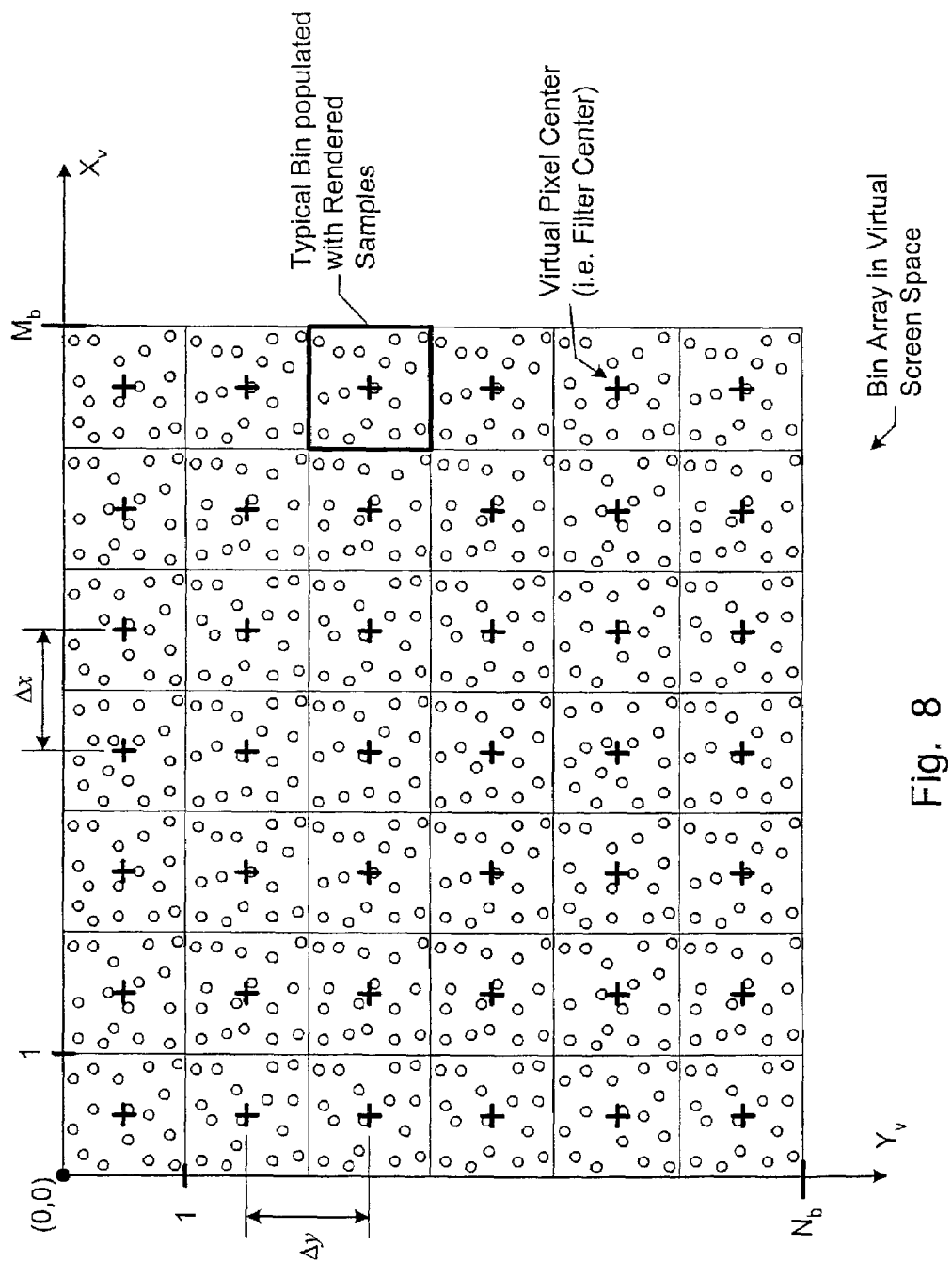
FIG. 8 illustrates an array of virtual pixel positions distributed in the virtual screen space and superimposed on top of the array of spatial bins.

As suggested by FIG. 8, filtering engine 600 may scan through virtual screen space in raster fashion generating virtual pixel positions denoted by the small plus markers, and generating a video pixel at each of the virtual pixel positions based on the samples (small circles) in the neighborhood of the virtual pixel position. The virtual pixel positions are also referred to herein as filter centers (or kernel centers) since the video pixels are computed by means of a filtering of samples. The virtual pixel positions form an array with horizontal displacement $\Delta X$ between successive virtual pixel positions in a row and vertical displacement $\Delta Y$ between successive rows. The first virtual pixel position in the first row is controlled by a start position ($X_{start}$, $Y_{start}$). The horizontal displacement $\Delta X$, vertical displacement $\Delta Y$ and the start coordinates $X_{start}$ and $Y_{start}$ are programmable parameters.

FIG. 8 illustrates a virtual pixel position at the center of each bin. However, this arrangement of the virtual pixel positions (at the centers of render pixels) is a special case. More generally, the horizontal displacement $\Delta x$ and vertical displacement $\Delta y$ may be assigned values greater than or less than one. Furthermore, the start position ($X_{start}$, $Y_{start}$) is not constrained to lie at the center of a spatial bin. Thus, the vertical resolution $N_P$ of the array of virtual pixel centers may be different from $N_B$, and the horizontal resolution $M_P$ of the array of virtual pixel centers may be different from $M_B$.

Figure 9:
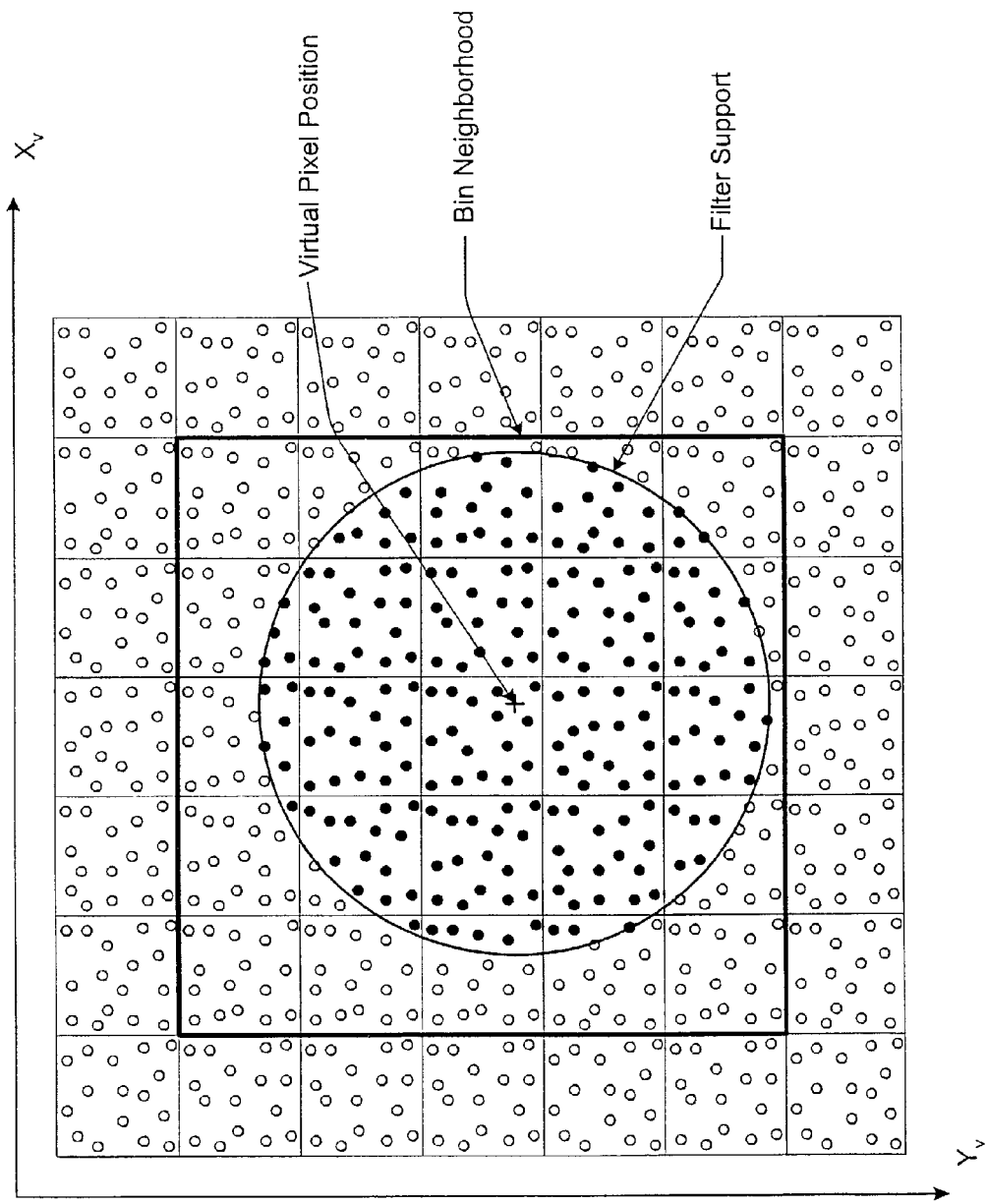
FIG. 9 illustrates the computation of a pixel at a virtual pixel position (denoted by the plus marker) according to one set of embodiments.

The filtering engine 600 may compute a video pixel at a particular virtual pixel position as suggested by FIG. 9. The filtering engine 600 may compute the video pixel based on a filtration of the samples falling within a support region centered on (or defined by) the virtual pixel position. Each sample S falling within the support region may be assigned a filter coefficient $C_S$ based on the sample's position (or some function of the sample's radial distance) with respect to the virtual pixel position.

Each of the color components of the video pixel may be determined by computing a weighted sum of the corresponding sample color components for the samples falling inside the filter support region. For example, the filtering engine 600 may compute an initial red value $r_P$ for the video pixel P according to the expression $$r_P = \sum C_S r_S,$$

where the summation ranges over each sample S in the filter support region, and where $r_S$ is the red sample value of the sample S. In other words, the filtering engine 600 may multiply the red component of each sample S in the filter support region by the corresponding filter coefficient $C_S$, and add up the products. Similar weighted summations may be performed to determine an initial green value $g_P$, an initial blue value $b_P$, and optionally, an initial alpha value $\alpha_P$ for the video pixel P based on the corresponding components of the samples.

Furthermore, the filtering engine 600 may compute a normalization value E by adding up the filter coefficients $C_S$ for the samples S in the bin neighborhood, i.e., $$E = \sum C_S.$$

The initial pixel values may then be multiplied by the reciprocal of E (or equivalently, divided by E) to determine normalized pixel values:

$R_P = (1/E)^* r_P$ $G_P = (1/E)^* g_P$ $B_P = (1/E)^* b_P$ $A_P = (1/E)^* \alpha_P$.

In one set of embodiments, the filter coefficient $C_S$ for each sample S in the filter support region may be determined by a table lookup. For example, a radially symmetric filter may be realized by a filter coefficient table, which is addressed by a function of a sample's radial distance with respect to the virtual pixel center. The filter support for a radially symmetric filter may be a circular disk as suggested by the example of FIG. 9. The support of a filter is the region in virtual screen space on which the filter is defined. The terms "filter" and "kernel" are used as synonyms herein. Let $R_f$ denote the radius of the circular support disk.

The filtering engine 600 may examine each sample S in a neighborhood of bins containing the filter support region. The bin neighborhood may be a rectangle (or square) of bins. For example, in one embodiment the bin neighborhood is a 5×5 array of bins centered on the bin which contains the virtual pixel position.

The filtering engine 600 may compute the square radius $(D^s)^2$ of each sample position $(X_S, Y_S)$ in the bin neighborhood with respect to the virtual pixel position $(X_P, Y_P)$ according to the expression $$(D_S)^2 = (X_S - X_P)^2 + (Y_S - Y_P)^2.$$

The square radius $(D_S)^2$ may be compared to the square radius $(R_f)^2$ of the filter support. If the sample's square radius is less than (or, in a different embodiment, less than or equal to) the filter's square radius, the sample S may be marked as being valid (i.e., inside the filter support). Otherwise, the sample S may be marked as invalid.

The filtering engine 600 may compute a normalized square radius $U_S$ for each valid sample S by multiplying the sample's square radius by the reciprocal of the filter's square radius:

$$U_S = (D_S)^2 \frac{1}{(R_f)^2}.$$

The normalized square radius $U_S$ may be used to access the filter coefficient table for the filter coefficient $C_S$. The filter coefficient table may store filter weights indexed by the normalized square radius.

In various embodiments, the filter coefficient table is implemented in RAM and is programmable by host software. Thus, the filter function (i.e. the filter kernel) used in the filtering process may be changed as needed or desired. Similarly, the square radius $(R_f)^2$ of the filter support and the reciprocal square radius $1/(R_f)^2$ of the filter support may be programmable.

Because the entries in the filter coefficient table are indexed according to normalized square distance, they need not be updated when the radius $R_f$ of the filter support changes. The filter coefficients and the filter radius may be modified independently.

In one embodiment, the filter coefficient table may be addressed with the sample radius $D_S$ at the expense of computing a square root of the square radius $(D_S)^2$. In another embodiment, the square radius may be converted into a floating-point format, and the floating-point square radius may be used to address the filter coefficient table. It is noted that the filter coefficient table may be indexed by any of various radial distance measures. For example, an $L^1$ norm or $L^{infinity}$ norm may be used to measure the distance between a sample position and the virtual pixel center.

Invalid samples may be assigned the value zero for their filter coefficients. Thus, the invalid samples end up making a null contribution to the pixel value summations. In other embodiments, filtering hardware internal to the filtering engine may be configured to ignore invalid samples. Thus, in these embodiments, it is not necessary to assign filter coefficients to the invalid samples.

In some embodiments, the filtering engine 600 may support multiple filtering modes. For example, in one collection of embodiments, the filtering engine 600 supports a box filtering mode as well as a radially symmetric filtering mode. In the box filtering mode, filtering engine 600 may implement a box filter over a rectangular support region, e.g., a square support region with radius $R_f$ (i.e. side length $2R_f$). Thus, the filtering engine 600 may compute boundary coordinates for the support square according to the expressions $X_P+R_f$, $X_P-R_f$, $Y_P+R_f$, and $Y_P-R_f$. Each sample S in the bin neighborhood may be marked as being valid if the sample's position $(X_S, Y_S)$ falls within the support square, i.e., if $$X_P-R_f<X_S<X_P+R_f \text{ and}$$

$$Y_P-R_f<Y_S<Y_P+R_f.$$

Otherwise the sample S may be marked as invalid. Each valid sample may be assigned the same filter weight value (e.g., $C_S=1$). It is noted that any or all of the strict inequalities (<) in the system above may be replaced with permissive inequalities ($\leq$). Various embodiments along these lines are contemplated.

The filtering engine 600 may use any of a variety of filters either alone or in combination to compute pixel values from sample values. For example, the filtering engine 600 may use a box filter, a tent filter, a cone filter, a cylinder filter, a Gaussian filter, a Catmull-Rom filter, a Mitchell-Netravali filter, a windowed sinc filter, or in general, any form of band pass filter or any of various approximations to the sinc filter.

In one set of embodiments, the filtering engine 600 may include a set of filtering units FU(0), FU(1), FU(2), ..., FU($N_f$-1) operating in parallel, where the number $N_f$ of filtering units is a positive integer. For example, in one embodiment, $N_f=4$. In another embodiment, $N_f=8$.

The filtering units may be configured to partition the effort of generating each frame (or field of video). A frame of video may comprise an $M_P \times N_P$ array of pixels, where $M_P$ denotes the number of pixels per line, and $N_P$ denotes the number of lines. Each filtering unit FU(K) may be configured to generate a corresponding subset of the pixels in the $M_P \times N_P$ pixel array. For example, in the $N_f=4$ case, the pixel array may be partitioned into four vertical stripes, and each filtering unit FU(K), K=0, 1, 2, 3, may be configured to generate the pixels of the corresponding stripe.

Filtering unit FU(K) may include a system of digital circuits, which implement the processing loop suggested below. The values $X_{start}(K)$ and $Y_{start}(K)$ represent the start position for the first (e.g. top-left) virtual pixel center in the $K^{th}$ stripe of virtual pixel centers. The values $\Delta X(K)$ and $\Delta Y(K)$ represent respectively the horizontal and vertical step size between virtual pixel centers in the $K^{th}$ stripe. The value $M_H(K)$ represents the number of pixels horizontally in the $K^{th}$ stripe. For example, if there are four stripes ($N_f=4$) with equal width, $M_H(K)$ may be set equal to $M_P/4$ for K=0, 1, 2, 3. Filtering unit FU(K) may generate a stripe of pixels in a scan line fashion as follows:

```
I = 0;
J = 0;
Xp = X_start(K);
```

Yp = $Y_{start}$(K);
while (J < Np) {
    while (I < $M_H$(K) {
        PixelValues = Filtration(Xp,Yp);
        Send PixelValues to Output Buffer;
        Xp = Xp + $\Delta$X(K);
        I = I + 1;
    }
    Xp = $X_{start}$(K)
    Yp = Yp + $\Delta$Y(K);
    J = J + 1;
}

The expression Filtration($X_P$, $Y_P$) represents the filtration of samples in the bin filter support region of the current virtual pixel position ($X_P$, $Y_P$) to determine the components (e.g. RGB values, and optionally, an alpha value) of the current pixel as described above. Once computed, the pixel values may be sent to an output buffer for merging into a video stream. The inner loop generates successive virtual pixel positions within a single row of the stripe. The outer loop generates successive rows. The above fragment may be executed once per video frame (or field). Filtering unit FU(K) may include registers for programming the values $X_{start}(K)$, $Y_{start}(K)$, $\Delta X(K)$, $\Delta Y(K)$, and $M_H(K)$. These values are dynamically adjustable from host software. Thus, the graphics system 100 may be configured to support arbitrary video formats.

Figure 10:
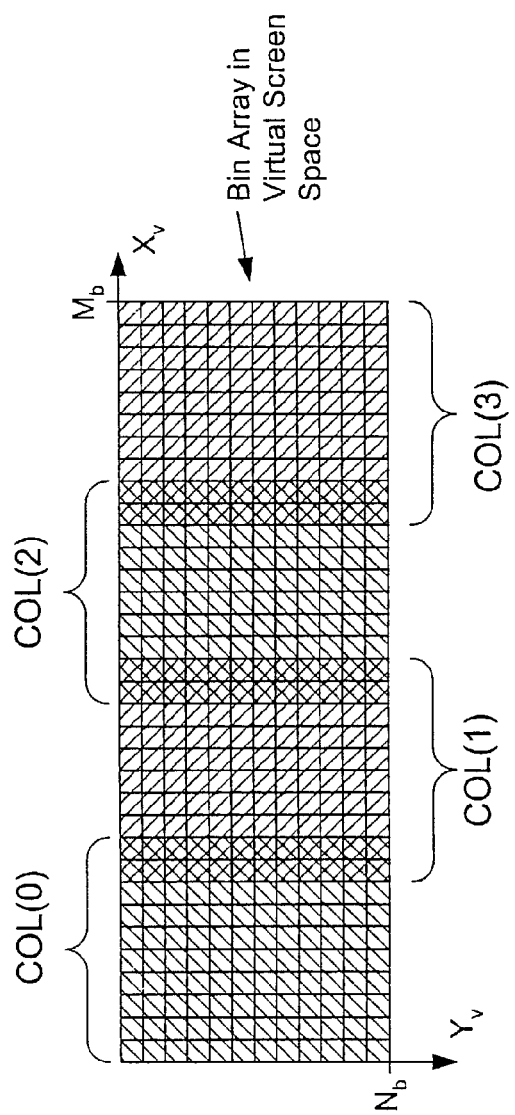
FIG. 10 illustrates a set of columns in the spatial bin array, wherein the $K^{th}$ column defines the subset of memory bins (from the sample buffer) which are used by a corresponding filtering unit FU(K) of the filtering engine.

Each filtering unit FU(K) accesses a corresponding subset of bins from the sample buffer 500 to generate the pixels of the $K^{th}$ stripe. For example, each filtering unit FU(K) may access bins corresponding to a column COL(K) of the bin array in virtual screen space as suggested by FIG. 10. Each column may be a rectangular subarray of bins. Note that column COL(K) may overlap with adjacent columns. This is a result of using a filter function with filter support that covers more than one spatial bin. Thus, the amount of overlap between adjacent columns may depend on the radius of the filter support.

Figure 11:
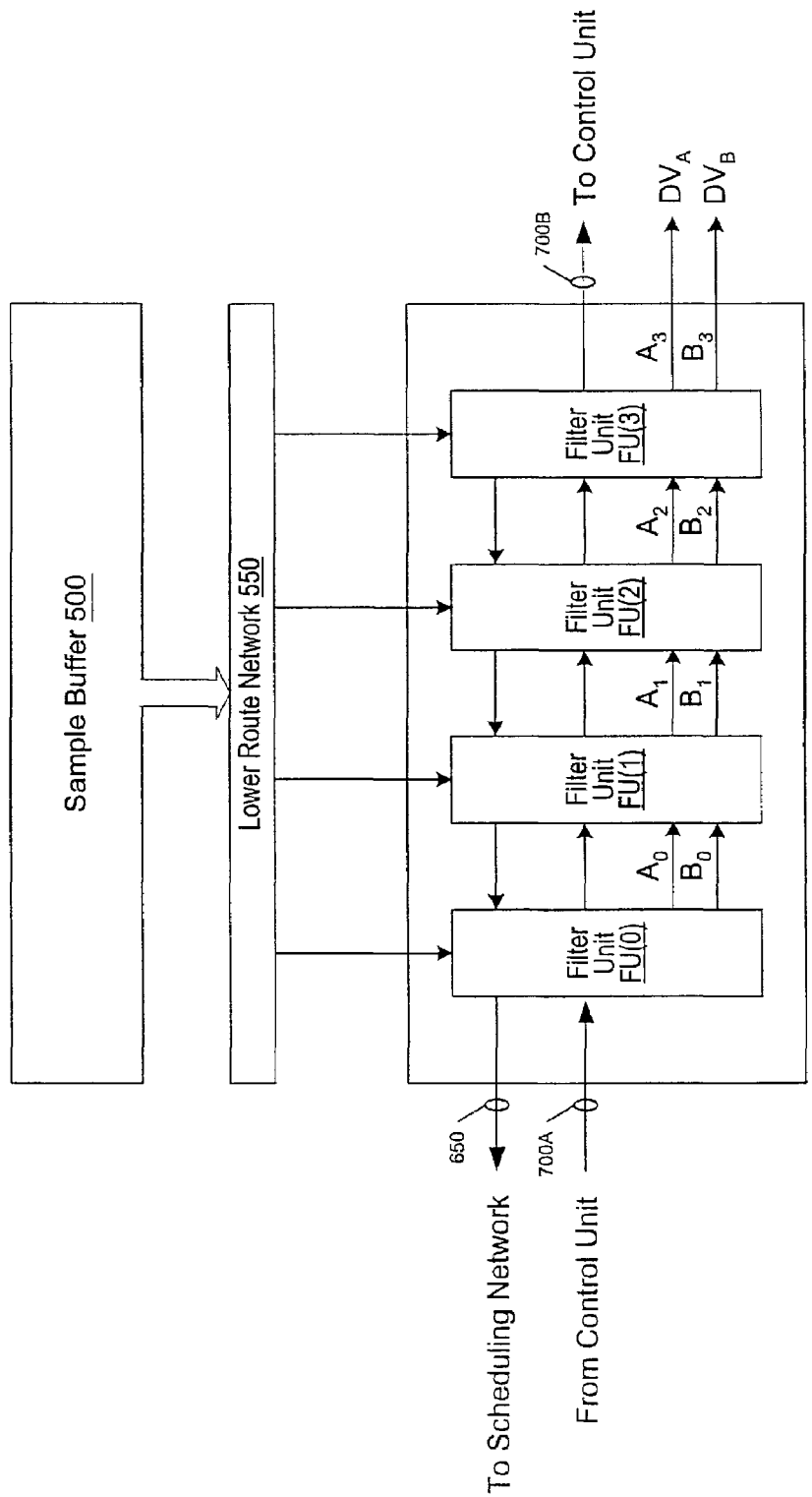
FIG. 11 illustrates one set of embodiments of filtering engine 600.

The filtering units may be coupled together in a linear succession as suggested by FIG. 11 in the case $N_f=4$. Except for the first filtering unit FU(0) and the last filtering unit FU($N_f$-1), each filtering unit FU(K) may be configured to receive digital video input streams $A_{K-1}$ and $B_{K-1}$ from a previous filtering unit FU(K-1), and to transmit digital video output streams $A_K$ and $B_K$ to the next filtering unit FU(K+1). The first filtering unit FU(0) generates video streams $A_0$ and $B_0$ and transmits these streams to filtering unit FU(1). The last filtering unit FU($N_f$-1) receives digital video streams $A_{Nf-2}$ and $B_{Nf-2}$ from the previous filtering unit FU($N_f$-2), and generates digital video output streams $A_{Nf-1}$ and $B_{Nf-1}$ also referred to as video streams $DV_A$ and $DV_B$ respectively. Video streams $A_0, A_1, \ldots, A_{Nf-1}$ are said to belong to video stream A. Similarly, video streams $B_0, B_1, \ldots, B_{Nf-1}$ are said to belong to video stream B.

Each filtering unit FU(K) may be programmed to mix (or substitute) its computed pixel values into either video stream A or video stream B. For example, if the filtering unit FU(K) is assigned to video stream A, the filtering unit FU(K) may mix (or substitute) its computed pixel values into video stream A, and pass video stream B unmodified to the next filtering unit FU(K+1). In other words, the filtering unit FU(K) may mix (or replace) at least a subset of the dummy pixel values present in video stream $A_{K-1}$ with its locally computed pixel values. The resultant video stream $A_K$ is transmitted to the next filtering unit. The first filtering unit FU(0) may generate video streams $A_{-1}$ and $B_{-1}$ containing dummy pixels (e.g., pixels having a background color), and mix (or substitute) its computed pixel values into either video stream $A_{-1}$ or $B_{-1}$, and pass the resulting streams $A_0$ and $B_0$ to the filtering unit FU(1). Thus, the video streams A and B mature into complete video signals as they are operated on by the linear succession of filtering units.

The filtering unit FU(K) may also be configured with one or more of the following features: color look-up using pseudo color tables, direct color, inverse gamma correction, and conversion of pixels to non-linear light space. Other features may include programmable video timing generators, programmable pixel clock synthesizers, cursor generators, and crossbar functions.

While much of the present discussion has focused on the case where $N_f=4$, it is noted that the inventive principles described in this special case naturally generalize to arbitrary values for the parameter $N_f$ (the number of filtering units).

Figure 12:
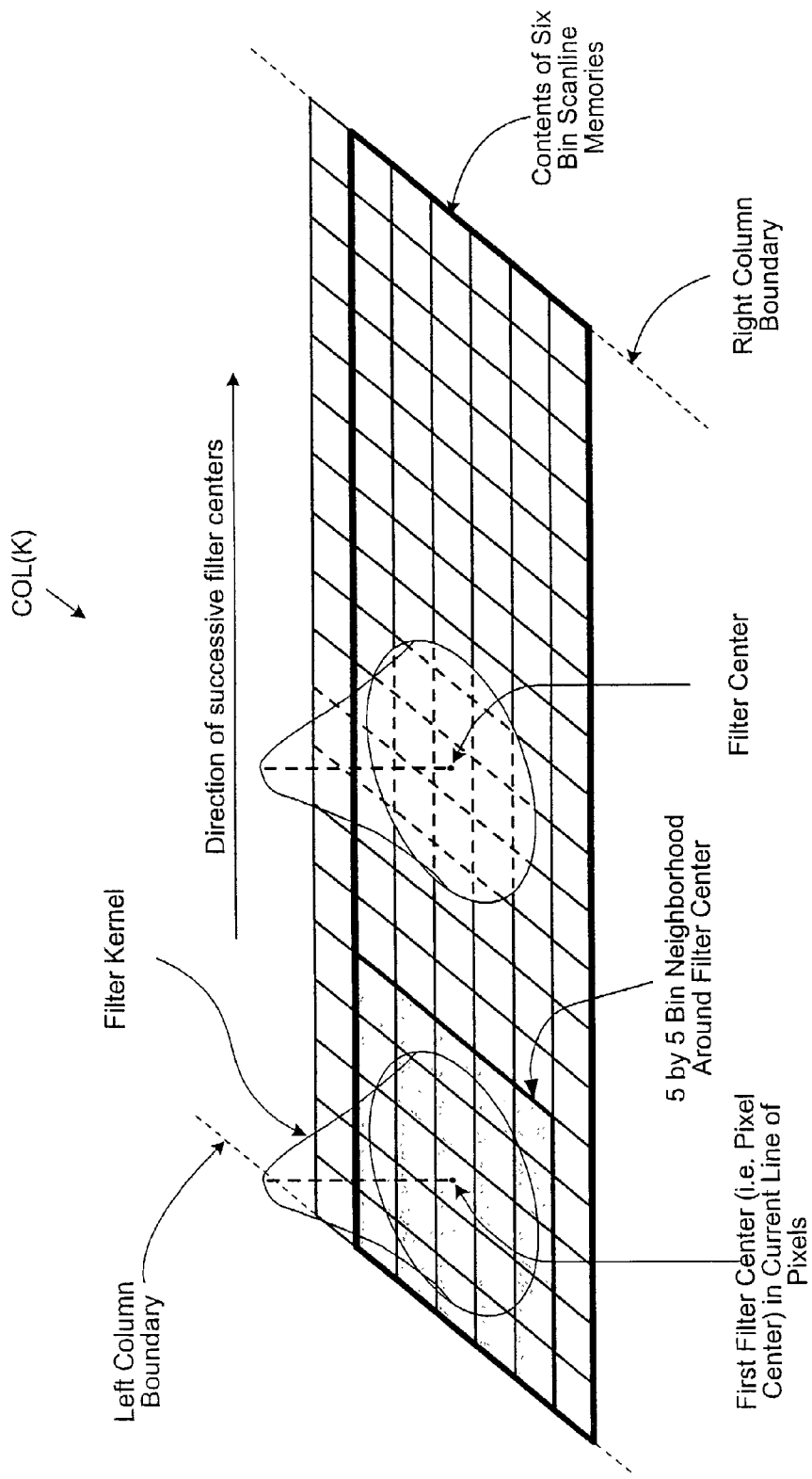
FIG. 12 illustrates one embodiment of a computation of pixels at successive filter center (i.e. virtual pixel centers) across a bin column.

In one set of embodiments, each filtering unit FU(K) may include (or couple to) a plurality of bin scanline memories (BSMs). Each bin scanline memory may contain sufficient capacity to store a horizontal line of bins within the corresponding column COL(K). For example, in some embodiments, filtering unit FU(K) may include six bin scanline memories as suggested by FIG. 12.

Filtering unit FU(K) may move the filter centers through the column COL(K) in a raster fashion, and generate a pixel at each filter center. The bin scanline memories may be used to provide fast access to the memory bins used for a line of pixel centers. As the filtering unit FU(K) may use samples in a 5 by 5 neighborhood of bins around a pixel center to compute a pixel, successive pixels in a line of pixels end up using a horizontal band of bins that spans the column and measures five bins vertically. Five of the bin scan lines memories may store the bins of the current horizontal band. The sixth bin scan line memory may store the next line of bins, after the current band of five, so that the filtering unit FU(K) may immediately begin computation of pixels at the next line of pixel centers when it reaches the end of the current line of pixel centers.

As the vertical displacement $\Delta Y$ between successive lines of virtual pixels centers may be less than the vertical size of a bin, not every vertical step to a new line of pixel centers necessarily implies use of a new line of bins. Thus, a vertical step to a new line of pixel centers will be referred to as a nontrivial drop down when it implies the need for a new line of bins. Each time the filtering unit FU(K) makes a nontrivial drop down to a new line of pixel centers, one of the bin scan line memories may be loaded with a line of bins in anticipation of the next nontrivial drop down.

Much of the above discussion has focused on the use of six bin scanline memories in each filtering unit. However, more generally, the number of bin scanline memories may be one larger than the diameter (or side length) of the bin neighborhood used for the computation of a single pixel. (For example, in an alternative embodiment, the bin neighborhood may be a 7×7 array of bins.)

Furthermore, each of the filtering units FU(K) may include a bin cache array to store the memory bins that are immediately involved in a pixel computation. For example, in some embodiments, each filtering unit FU(K) may include a 5×5 bin cache array, which stores the 5×5 neighborhood of bins that are used in the computation of a single pixel. The bin cache array may be loaded from the bin scanline memories.

As noted above, each rendering pipeline of the rendering engine 300 generates sample positions in the process of rendering primitives. Sample positions within a given spatial bin may be generated by adding a vector displacement ($\Delta X$, $\Delta Y$) to the vector position ($X_{bin}$, $Y_{bin}$) of the bin's origin (e.g. the top-left corner of the bin). To generate a set of sample positions within a spatial bin implies adding a corresponding set of vector displacements to the bin origin. To facilitate the generation of sample positions, each rendering pipeline may include a programmable jitter table which stores a collection of vector displacements ($\Delta X$, $\Delta Y$). The jitter table may have sufficient capacity to store vector displacements for an $M_J \times N_J$ tile of bins. Assuming a maximum sample position density of $D_{max}$ samples per bin, the jitter table may then store $M_J * N_J * D_{max}$ vector displacements to support the tile of bins. Host software may load the jitter table with a pseudo-random pattern of vector displacements to induce a pseudo-random pattern of sample positions. In one embodiment, $M_J=N_J=2$ and $D_{max}=16$.

A straightforward application of the jitter table may result in a sample position pattern, which repeats with a horizontal period equal to $M_J$ bins, and a vertical period equal to $N_J$ bins. However, in order to generate more apparent randomness in the pattern of sample positions, each rendering engine may also include a permutation circuit, which applies transformations to the address bits going into the jitter table and/or transformations to the vector displacements coming out of the jitter table. The transformations depend on the bin horizontal address $X_{bin}$ and the bin vertical address $Y_{bin}$.

Each rendering unit may employ such a jitter table and permutation circuit to generate sample positions. The sample positions are used to compute samples, and the samples are written into sample buffer 500. Each filtering unit of the filtering engine 600 reads samples from sample buffer 500, and may filter the samples to generate pixels. Each filtering unit may include a copy of the jitter table and permutation circuit, and thus, may reconstruct the sample positions for the samples it receives from the sample buffer 500, i.e., the same sample positions that are used to compute the samples in the rendering pipelines. Thus, the sample positions need not be stored in sample buffer 500.

As noted above, sample buffer 500 stores the samples, which are generated by the rendering pipelines and used by the filtering engine 600 to generate pixels. The sample buffer 500 may include an array of memory devices, e.g., memory devices such as SRAMs, SDRAMs, RDRAMs, 3DRAMs or 3DRAM64s. In one collection of embodiments, the memory devices are 3DRAM64 devices manufactured by Mitsubishi Electric Corporation.

RAM is an acronym for random access memory.

SRAM is an acronym for static random access memory.

DRAM is an acronym for dynamic random access memory.

SDRAM is an acronym for synchronous dynamic random access memory.

RDRAM is an acronym for Rambus DRAM.

The memory devices of the sample buffer may be organized into $N_{MB}$ memory banks denoted MB(0), MB(1), MB(2), ..., MB($N_{MB}-1$), where $N_{MB}$ is a positive integer. For example, in one embodiment, $N_{MB}$ equals eight. In another embodiment, $N_{MB}$ equals sixteen.

Each memory bank MB may include a number of memory devices. For example, in some embodiments, each memory bank includes four memory devices.

Each memory device stores an array of data items. Each data item may have sufficient capacity to store sample color in a double-buffered fashion, and other sample components such as z depth in a single-buffered fashion. For example, in one set of embodiments, each data item may include 116 bits of sample data defined as follows:

30 bits of sample color (for front buffer),
30 bits of sample color (for back buffer),
16 bits of alpha and/or overlay,
10 bits of window ID,
26 bits of z depth, and
4 bits of stencil.

Each of the memory devices may include one or more pixel processors, referred to herein as memory-integrated pixel processors. The 3DRAM and 3DRAM64 memory devices manufactured by Mitsubishi Electric Corporation have such memory-integrated pixel processors. The memory-integrated pixel processors may be configured to apply processing operations such as blending, stenciling, and Z buffering to samples. 3DRAM64s are specialized memory devices configured to support internal double-buffering with single buffered Z in one chip.

Figure 13:
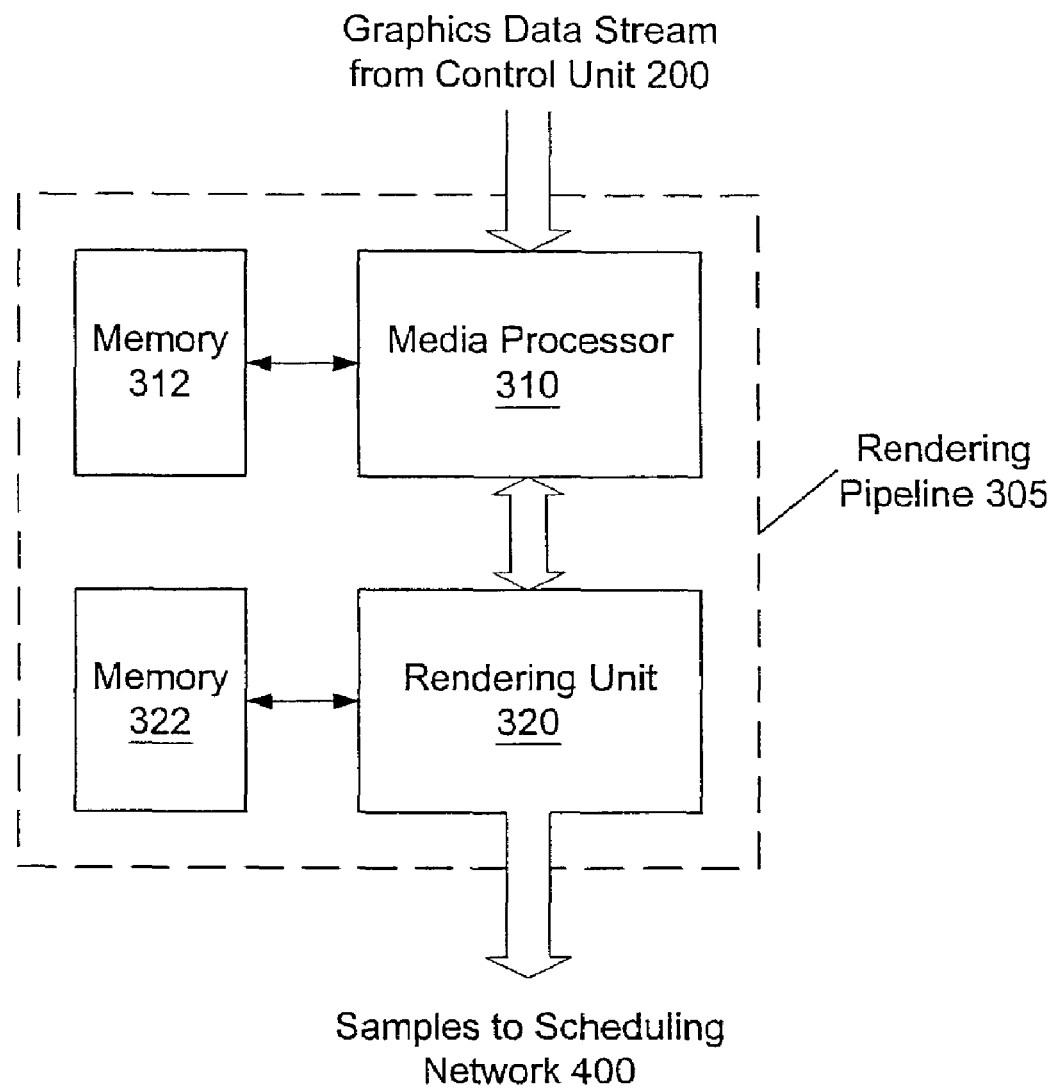
FIG. 13 illustrates one set of embodiments of a rendering pipeline comprising a media processor and a rendering unit.

As described above, the rendering engine 300 may include a set of rendering pipelines RP(0), RP(1), ..., RP($N_{PL}$–1). FIG. 13 illustrates one embodiment of a rendering pipeline 305 that may be used to implement each of the rendering pipelines RP(0), RP(1), ..., RP($N_{PL}$–1). The rendering pipeline 305 may include a media processor 310 and a rendering unit 320.

The media processor 310 may operate on a stream of graphics data received from the control unit 200. For example, the media processor 310 may perform the three-dimensional transformation operations and lighting operations such as those indicated by steps 710 through 735 of FIG. 4. The media processor 310 may be configured to support the decompression of compressed geometry data.

The media processor 310 may couple to a memory 312, and may include one or more microprocessor units. The memory 312 may be used to store program instructions and/or data for the microprocessor units. (Memory 312 may also be used to store display lists and/or vertex texture maps.) In one embodiment, memory 312 comprises direct Rambus DRAM (i.e. DRDRAM) devices.

The rendering unit 320 may receive transformed and lit vertices from the media processor, and perform processing operations such as those indicated by steps 737 through 775 of FIG. 4. In one set of embodiments, the rendering unit 320 is an application specific integrated circuit (ASIC). The rendering unit 320 may couple to memory 322 which may be used to store texture information (e.g., one or more layers of textures). Memory 322 may comprise SDRAM (synchronous dynamic random access memory) devices. The rendering unit 310 may send computed samples to sample buffer 500 through scheduling network 400.

Figure 14:
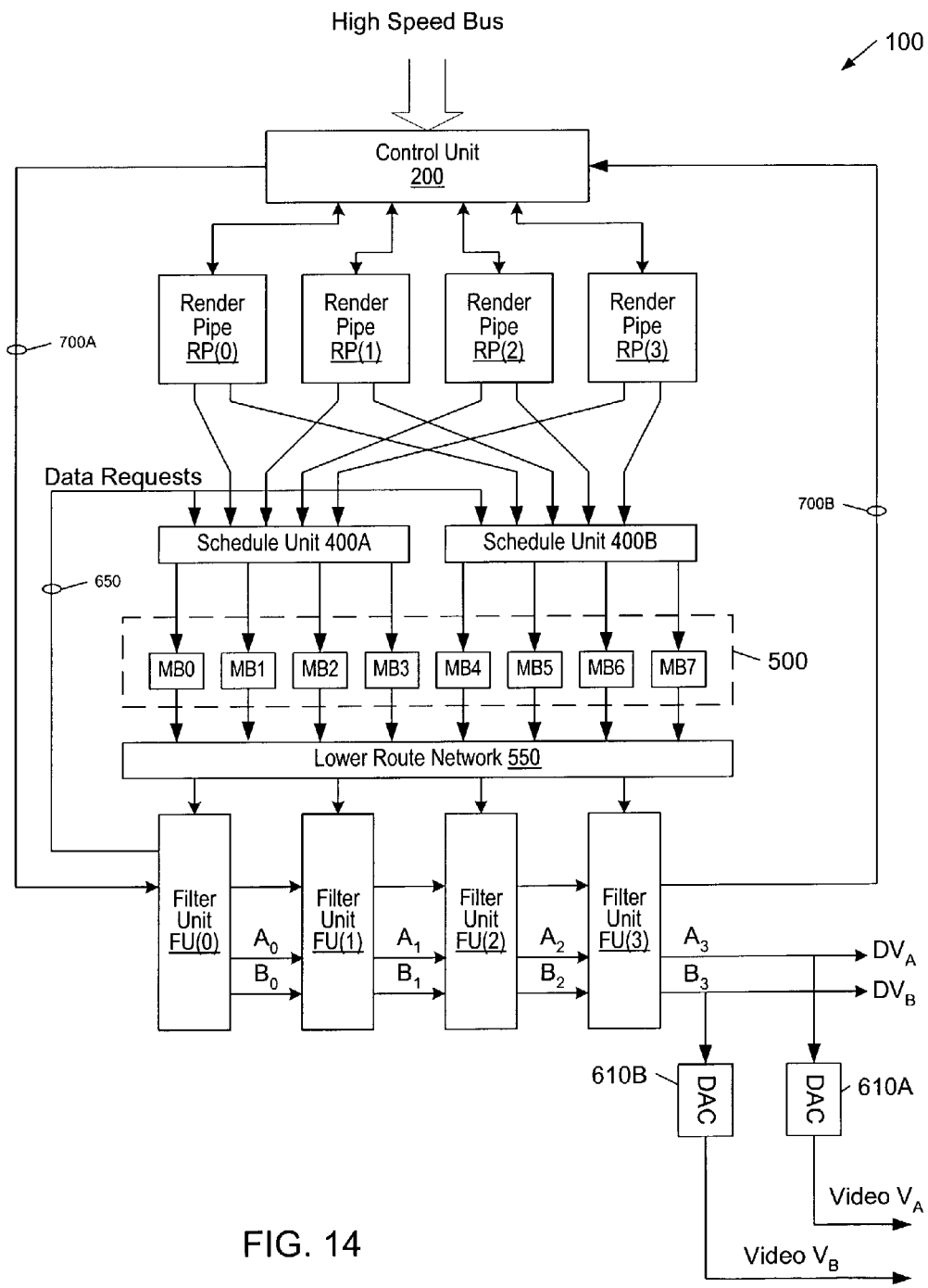
FIG. 14 illustrates one embodiment of graphics accelerator 100.

FIG. 14 illustrates one embodiment of the graphics accelerator 100. In this embodiment, the rendering engine 300 includes four rendering pipelines RP(0) through RP(3), scheduling network 400 includes two schedule units 400A and 400B, sample buffer 500 includes eight memory banks MB(0) through MB(7), and filtering engine 600 includes four filtering units FU(0) through FU(3). The filtering units may generate two digital video streams $DV_A$ and $DV_B$. The digital video streams $DV_A$ and $DV_B$ may be supplied to digital-to-analog converters (DACS) 610A and 610B, where they are converted into analog video signals $V_A$ and $V_B$ respectively. The analog video signals are supplied to video output ports. In addition, the graphics system 100 may include one or more video encoders. For example, the graphics system 100 may include an S-video encoder.

Figure 15:
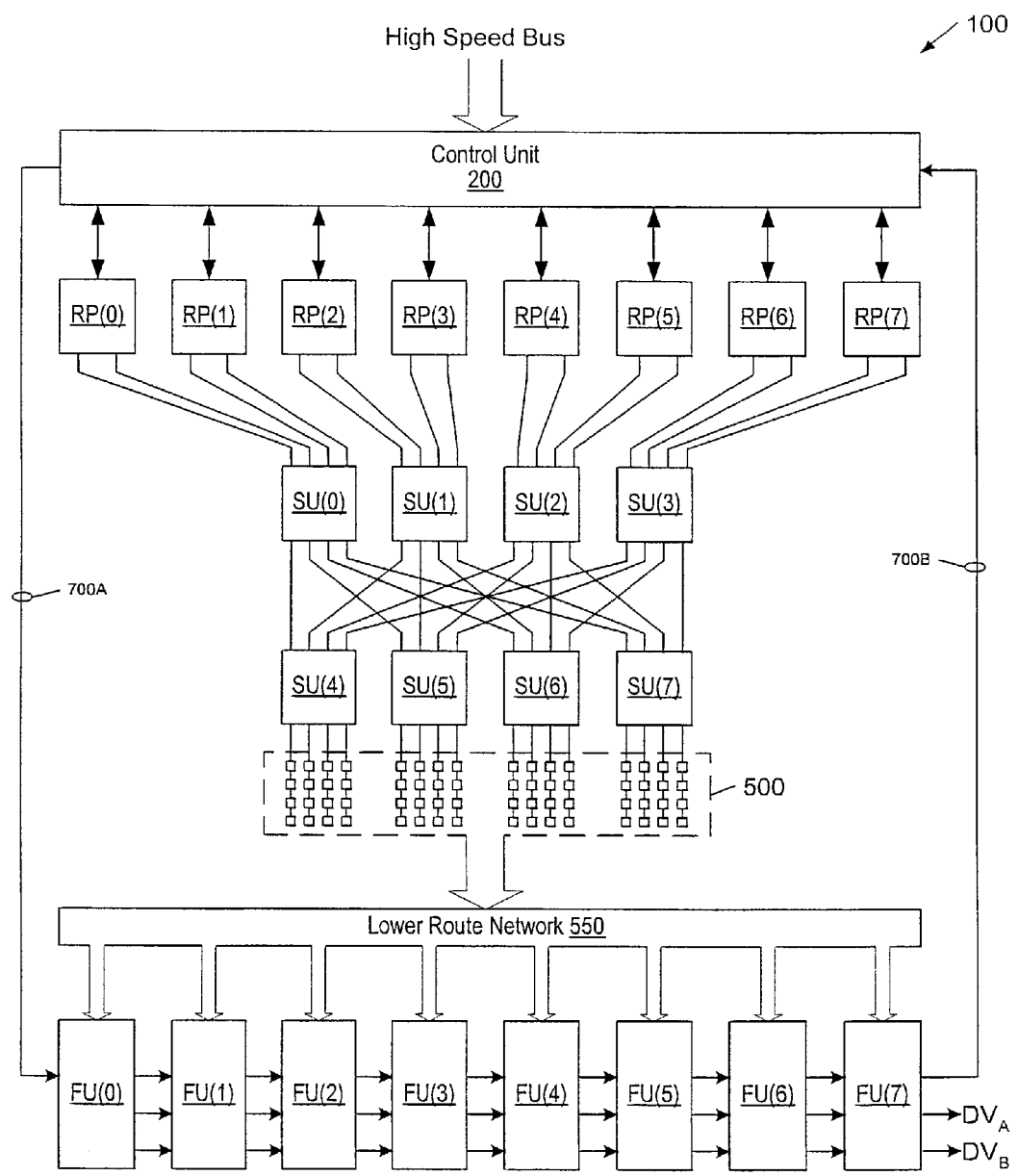
FIG. 15 illustrates another embodiment of graphics accelerator 100.

FIG. 15 illustrates another embodiment of graphics system 100. In this embodiment, the rendering engine 300 includes eight rendering pipelines RP(0) through RP(7), the scheduling network 400 includes eight schedule units SU(0) through SU(7), the sample buffer 500 includes sixteen memory banks, the filtering engine 600 includes eight filtering units FU(0) through FU(7). This embodiment of graphics system 100 also includes DACs to convert the digital video streams $DV_A$ and $DV_B$ into analog video signals.

Observe that the schedule units are organized as two layers. The rendering pipelines couple to the first layer of schedule unit SU(0) through SU(3). The first layer of schedule units couple to the second layer of schedule units SU(4) through SU(7). Each of the schedule units in the second layer couples to four banks of memory device in sample buffer 500.

The embodiments illustrated in FIGS. 14 and 15 are meant to suggest a vast ensemble of embodiments that are obtainable by varying design parameters such as the number of rendering pipelines, the number of schedule units, the number of memory banks, the number of filtering units, the number of video channels generated by the filtering units, etc.

Sample Buffer Context Management

As described variously above, the filtering engine 600 may include a set of $N_f$ filtering units denoted FU(0), FU(1), FU(2), ..., FU($N_f$). The filtering units may be programmatically assigned to video sets. Each video set of filtering units is responsible for computing pixels values for a corresponding video stream. For example, filtering units assigned to video set A may compute pixels for a video stream A, and filtering units assigned to video set B may compute pixels for video stream B. Please refer to U.S. patent application Ser. No. 09/894,617, filed on Jun. 27, 2001, entitled "Flexible Video Architecture for Generating Video Streams" for more information on how to generate video streams using a series of programmable filtering units. This patent application is hereby incorporated by reference in its entirety.

The filtering units in one video set may be programmed to expect a certain form for the sample data received from sample buffer 500. The filtering units in another video set may be programmed to expect a different form for the sample data received from sample buffer 500. For example, one video set may expect each sample to contain a window ID and an α component, while another video set may expect a larger window ID and no α component. (ID is an acronym for "identification tag".)

The memory devices of the sample buffer 500 may be programmable to perform certain processing on samples as they are written into the memory devices and/or as they are being transferred out of the memory devices. The filtering units in one video set may be programmed so that they expect certain processing operations to be performed on samples in the memory devices. The filtering units in another video set may be programmed so that they expect different processing operations to be performed on samples in the memory devices. For example, memory devices such as the 3DRAM devices manufactured by Mitsubishi have onboard arithmetic logic units (ALUs) which are programmable.

As described above, the sample buffer 500 includes a plurality of memory devices. Each of the memory devices may include a set of state registers. One of the functions of the state registers is to store state information that controls the output behavior of the memory devices so the memory devices will send out data in the form expected by the requesting filter units. The state registers may also store state information that specifies the processing operations to be performed on the samples as they are written into the memory device and/or read out from the memory device.

In some embodiments, state information may include values specifying the size of a sample, the number and size of attribute fields (e.g. color, α, window ID, overlay, z, etc.) in a sample, the number of samples per bin, the pixel resolution of a display device, number of bursts per screen line, and so on.

Figure 16:
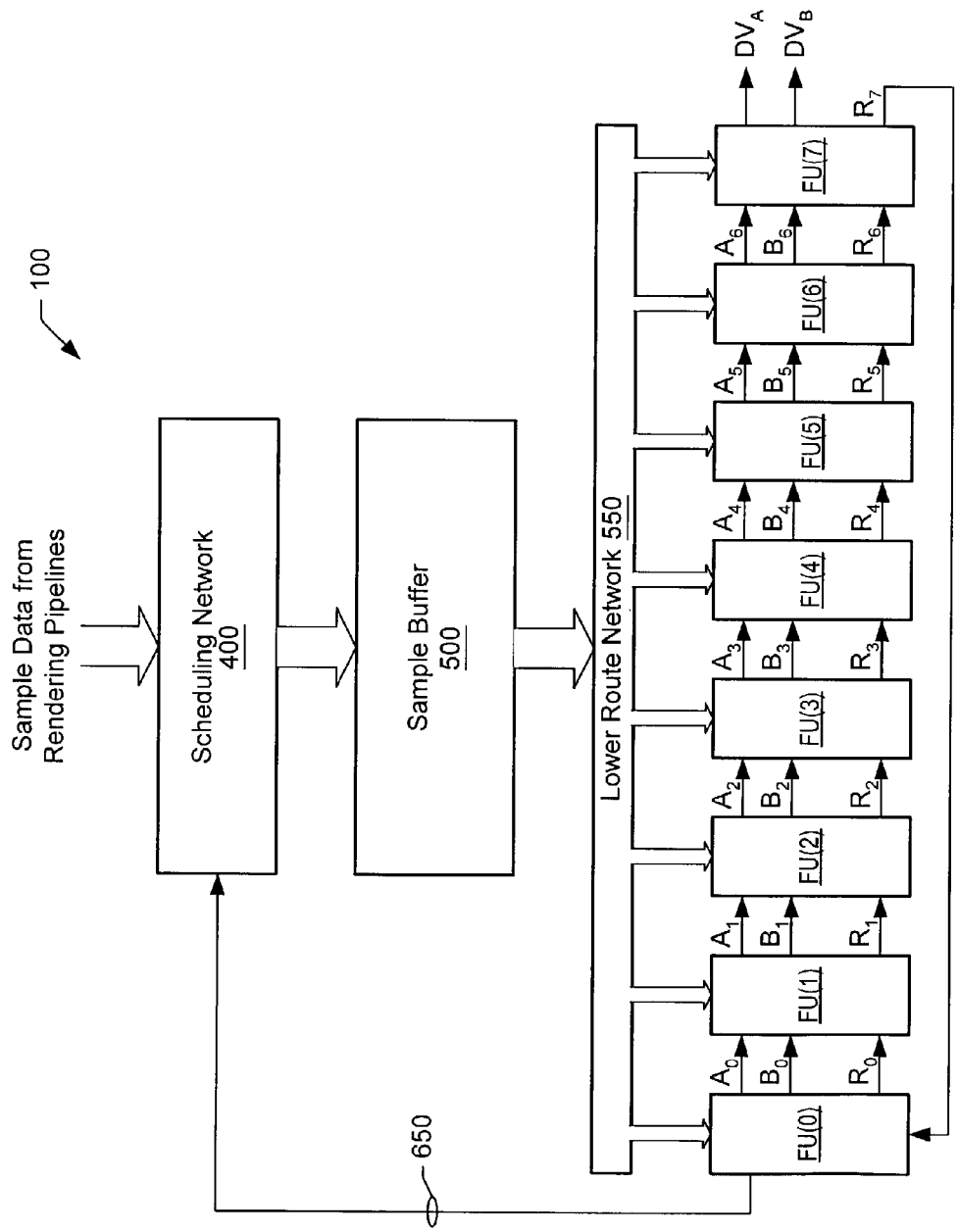
FIG. 16 illustrates one embodiment for a circular request bus that links together successive filtering units in the filtering engine 600.

In one set of embodiments, each filtering unit FU(K), K=0, 1, 2, ..., $N_f$-2, may couple to a next filtering unit FU(K+1) through a request bus $R_K$ as illustrated by FIG. 16 in the $N_f$=8 case. The last filtering unit FU($N_f$-1) may couple to the first filtering unit FU(0) through request bus $R_{Nf-1}$. Each filtering unit FU(K), K=0, 1, 2, ..., $N_f$-1, may send requests for scanlines of sample bins (from sample buffer 500) to the first filtering unit FU(0) through the series of request buses $R_K$, $R_{K+1}$, ..., $R_{Nf-1}$. The filtering unit FU(0) may break up a scanline request into multiple burst requests, and forward the burst requests to the scheduling network 400. The samples in a scanline of bins are partitioned into subsets called bursts, and the samples in the scanline are transferred from sample buffer 500 to the filtering engine 600 in multiple burst transfers.

The scheduling network may comprise one or more layers of schedule units as suggested by FIGS. 14 and 15. Each scheduling unit in the bottom layer may drive multiple banks of memory devices in the sample buffer 500 as described above. In one set of embodiments, the memory devices may be partitioned into one or more memory groups. For example, in the embodiment of FIG. 14, the memory devices may be partitioned into four memory groups GRP(0), GRP(1), GRP(2) and GRP(3), where GRP(K) includes the devices of memory banks MB(K) and MB(K+4) for K=0, 1, 2, 3. Successive screen lines of sample bins may be stored in successive memory groups. Scheduling unit 400A may control memory banks MB(0), MB(1), MB(2) and MB(3). Scheduling unit 400B may control memory banks MB(4), MB(5), MB(6) and MB(7).

Each screen line of sample bins may be stored in one of the memory groups. (A screen line of spatial bins is a set of sample bins corresponding to a horizontal line of the spatial bin array). Screen lines of sample bins may be assigned to memory groups in a cyclic fashion so that any two successive screen lines reside in different memory groups. Thus, the samples of each burst may reside in a single memory group.

The samples of a burst may be distributed to all the memory devices in a memory group to facilitate fast parallel access. Thus, the filtering unit FU(0) may send each burst request to both scheduling units 400A and 400B.

Each burst request may include a video set tag that indicates with which video set the request is associated. Each scheduling unit may include a set of video request processors (VRPs). Each video request processor corresponds to one of the memory banks connected to the scheduling unit. Thus, the separate memory groups may accessed simultaneously.

The filtering unit FU(0) may send each burst request to one of the video request processors depending on which memory group the burst resides in.

Each video request processor may store shadow copies of the state information for each video set. A video request unit examines the video set tag of a burst request, and determines if the video set $VS_{tag}$ designated by the video set tag is the same as the video set $VS_{previous}$ of the previous burst request. If the video set $VS_{tag}$ is not the same as the video set $VS_{previous}$, the video request processor updates the state registers of the memory devices in the corresponding memory bank with the shadow copy of state information corresponding to video set $VS_{tag}$, and directs memory devices of the corresponding memory bank to output samples corresponding to the requested burst. The samples flow down through the lower route network 550 to the requesting filter unit FU(K).

If the video set $VS_{tag}$ and the video set $VS_{previous}$ are the same, it is not necessary to update the state registers of the memory bank. Thus, the video request processor may service the burst request more directly.

Each video request processor may include a shadow memory for storing the shadow copies of state information for each video set. The shadow memories may be loaded by host software running on the host computer. Each video request processor may also contain a previous video set register for storing the video set value $VS_{previous}$ of the previous burst request. After servicing a current burst request, a video request processor may store the video set $VS_{tag}$ of the current burst request in the previous video set register in anticipation of the next burst request.

The shadow memory may also include copies of computational parameters for each video set. For example, the video request processors may convert two-dimensional spatial addresses provided in the burst request to a one-dimensional memory address. To perform this conversion, the video request processor may use parameters such as the number of samples per bin, the number of burst in a horizontal line across the screen, etc. The value of these parameters may be different for different video sets. Thus, the shadow memory may store such parameter data for each video set. Each video request processor uses the appropriate set of parameter information for each burst request based on the video set specified by the video set tag.

In one set of embodiments, a graphics system may be configured with a scheduling network, a sample buffer, a rendering engine and a filtering engine. The rendering engine may be configured to generate samples in response to received graphics data, and to forward the samples to the scheduling network for storage in the sample buffer. The filtering engine may be configured to send a request for samples to the scheduling network. The scheduling network may be configured to compare a video set designation of the request to a previous request designation, to update one or more state registers in one or more memory devices of the sample buffer in response to a determination that the video set designation of the request is different from the previous request designation, and to assert signals inducing a transfer of a collection of samples corresponding to the request from the one or more memory devices to the filtering engine. The filtering engine operates on the samples to produce pixel values.

In some embodiments, a method for operating a graphics system may be arranged as follows. A scheduling device may receive a request for a burst of samples stored in a sample buffer. The scheduling device may examine a context identification tag included in the request to determine if a first context specified by the context identification tag is currently resident in state registers of the sample buffer. The scheduling device may update the state registers of the sample buffer with values of the first context in response to a determination that the first context specified by the context identification tag is not currently resident in state registers of the sample buffer. The scheduling device may then assert signals that invoke a transfer of the samples from the sample buffer to a filtering engine. The filtering engine is configured to filter the samples to generate pixel values.

Figure 17:
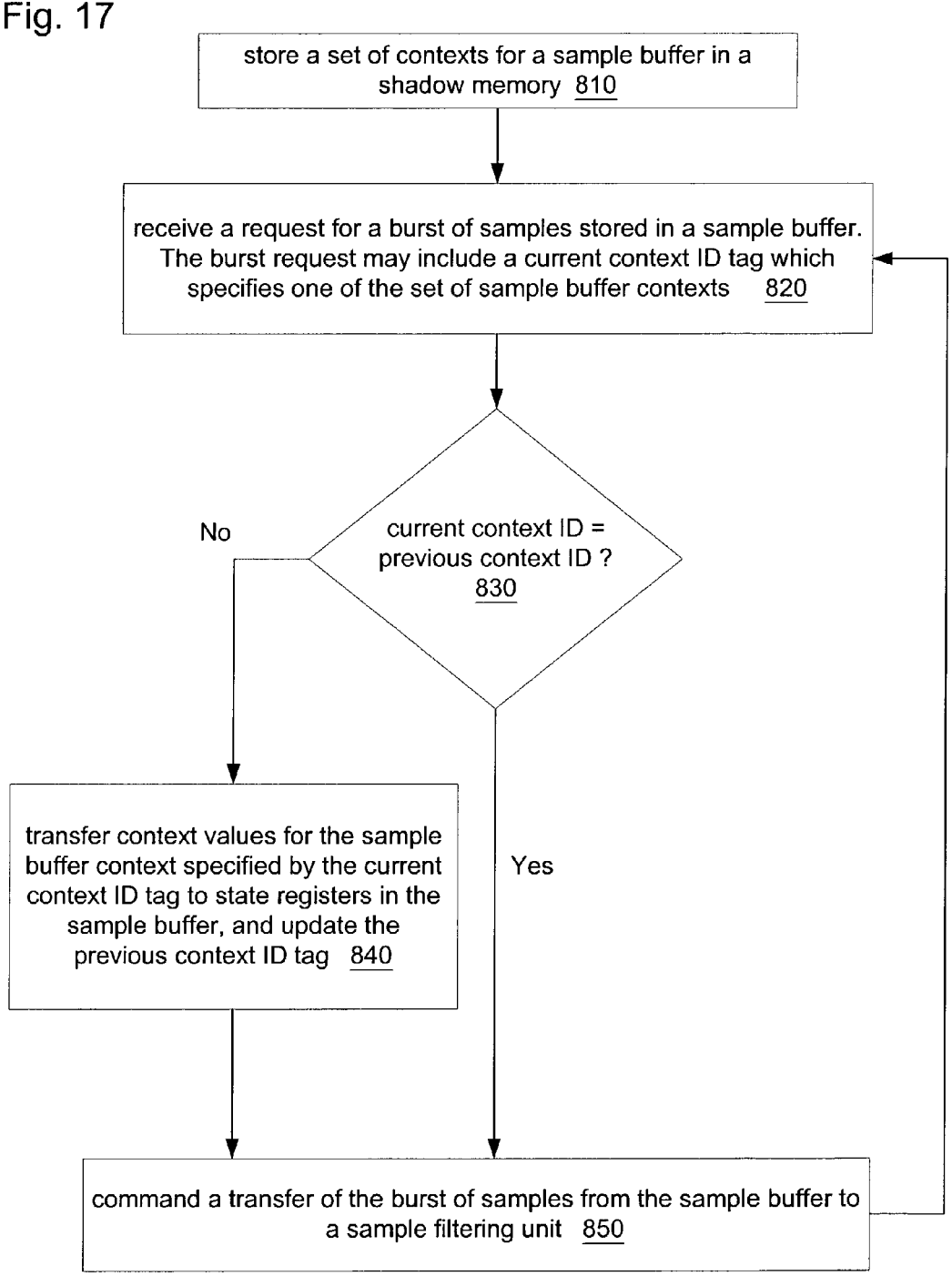
FIG. 17 illustrates one embodiment of a method for automatically switching sample buffer context in response to receive video requests of the filtering engine 600.

In one ensemble of embodiments, a method for operating a graphics system may be performed as suggested in FIG. 17. In step 810, a host computer coupled to the graphics system may store a set of contexts for a sample buffer in a shadow memory. For example, the shadow memory may reside in the scheduling network of graphics system 100.

In step 820, a scheduling unit of the scheduling network may receive a request for a burst of samples stored in the sample buffer. The burst request may include a context identification tag Tburst which specifies one of the set of sample buffer contexts.

In step 830, the scheduling unit may compare the context identification tag Tburst to a previous context identification tag of the previously serviced burst request.

If the context identification tag Tburst and the previous context identification tag do not agree, i.e. designate different sample buffer contexts, then step 840 may be performed. Otherwise step 850 may be performed.

In step 840, the scheduling unit may transfer context values of the sample buffer context specified by the context identification tag Tburst from the shadow memory to one or more state registers in the sample buffer, and then set the previous context identification tag equal to the context identification tag Tburst in anticipation of the next burst request.

In step 850, the scheduling unit may command a transfer of the burst of samples from the sample buffer to a sample filtering unit.

Numerous variations and modifications will become apparent to those skilled in the art once the above disclosure is fully appreciated. It is intended that the following claims be interpreted to embrace all such variations and modifications.

What is claimed is:

1. A system comprising:
    a scheduling network;
    a sample buffer, wherein the sample buffer is operated in a double-buffered fashion;
    a rendering engine configured to generate samples in response to received graphics data, and to forward the samples to the scheduling network for storage in the sample buffer; and
    a filtering engine configured to send a request for samples to the scheduling network,
    wherein the scheduling network is configured
        to compare a video set designation of the request to a previous request designation,
        to update one or more state registers in one or more memory devices of the sample buffer in response to a determination that the video set designation of the request is different from the previous request designation, and
        to assert signals inducing a transfer of a collection of samples corresponding to the request from the one or more memory devices to the filtering engine.

2. The system of claim 1, wherein the sample buffer comprises an array of memory devices including the one or more memory devices, and wherein each of the memory devices includes onboard arithmetic logic units.

3. The system of claim 1, wherein the filtering engine comprises a plurality of filtering units coupled in a linear series, wherein each of the filtering units is programmatically assigned to one of a collection of video sets, and wherein the filtering units assigned to each video set operate to generate a corresponding digital video stream.

4. The system of claim 3, wherein the collection of video sets includes two video sets.

5. The system of claim 1, wherein the sample buffer comprises an array of memory devices including the one or more memory devices, wherein the memory devices are partitioned into memory groups, wherein the scheduling network includes a set of schedule units.

6. The system of claim 1, wherein the one or more memory devices are configured to format the samples prior to transmission to the filtering engine in accordance with the state information stored in the state registers.

7. The system of claim 1, wherein the scheduling network includes a shadow memory configured to store shadow copies of state information for each video set in a collection of video sets, wherein the scheduling network is configured to update the one or more state registers in the one or more memory devices with one of the shadow copies of state information corresponding to the video set designation of the request.

8. A method comprising:
    receiving a request for a burst of samples stored in a sample buffer;
    examining a context identification tag included in the request to determine if a first context specified by the context identification tag is currently resident in state registers of the sample buffer;
    updating the state registers of the sample buffer with values of the first context in response to a determination that the first context specified by the context identification tag is not currently resident in state registers of the sample buffer;
    asserting signals that invoke a transfer of the burst of samples from the sample buffer to a filtering engine configured to filter the samples.

9. A method comprising:
    (a) storing a set of contexts for a sample buffer in a shadow memory;
    (b) receiving a request for a burst of samples stored in a sample buffer, wherein the burst request includes a current context identification tag which specifies one of the set of sample buffer contexts;
    (c) comparing the current context identification tag to a previous context identification tag of a previously serviced burst request;
    (d) transferring context values corresponding to the sample buffer context specified by the current context identification tag from the shadow memory to one or more state registers in the sample buffer in response to determining that the current context identification tag is different from the previous context identification tag;
    (e) commanding a transfer of the burst of samples from the sample buffer to a sample filtering unit.

10. The method of claim 9 further comprising setting the previous context identification tag equal to the current context identification tag after (d), and repeating (b) through (e) for a next burst request.

11. A system for filtering samples for a plurality of video streams, the system comprising:
    a scheduling network;
    a sample buffer;
    a rendering engine configured to generate samples in response to received graphics data, and to forward the samples to the scheduling network for storage in the sample buffer; and a filtering engine configured to send a request for samples to the scheduling network,
wherein the scheduling network is configured to:
compare a video set designation of the request to a previous request designation,
update one or more state registers in one or more memory devices of the sample buffer in response to a determination that the video set designation of the request is different from the previous request designation, and
assert signals inducing a transfer of a collection of samples corresponding to the request from the one or more memory devices to the filtering engine, and
wherein the one or more memory devices are configured to format the samples prior to transmission to the filtering engine in accordance with the state information stored in the state registers.

12. The system of claim 11, wherein the sample buffer comprises an array of memory devices including the one or more memory devices, and wherein each of the memory devices includes onboard arithmetic logic units.

13. The system of claim 11, wherein the filtering engine comprises a plurality of filtering units coupled in a linear series, wherein each of the filtering units is programmatically assigned to one of a collection of video sets, and wherein the filtering units assigned to each video set operate to generate a corresponding digital video stream.

14. The system of claim 11, wherein the scheduling network includes a shadow memory configured to store shadow copies of state information for each video set in a collection of video sets, wherein the scheduling network is configured to update the one or more state registers in the one or more memory devices with one of the shadow copies of state information corresponding to the video set designation of the request.

15. A system for filtering samples for a plurality of video streams, the system comprising:
a scheduling network;
a sample buffer;
a rendering engine configured to generate samples in response to received graphics data, and to forward the samples to the scheduling network for storage in the sample buffer; and
a filtering engine configured to send a request for samples to the scheduling network, wherein the filtering engine comprises a plurality of filtering units coupled in a linear series, wherein each of the filtering units is programmatically assigned to one of a collection of video sets, and wherein the filtering units assigned to each video set operate to generate a corresponding digital video stream;
wherein the scheduling network is configured to:
compare a video set designation of the request to a previous request designation,
update one or more state registers in one or more memory devices of the sample buffer in response to a determination that the video set designation of the request is different from the previous request designation, and
assert signals inducing a transfer of a collection of samples corresponding to the request from the one or more memory devices to the filtering engine.

16. The system of claim 15, wherein the sample buffer comprises an array of memory devices including the one or more memory devices, and wherein each of the memory devices includes onboard arithmetic logic units.

17. The system of claim 15, wherein the scheduling network includes a shadow memory configured to store shadow copies of state information for each video set in a collection of video sets, wherein the scheduling network is configured to update the one or more state registers in the one or more memory devices with one of the shadow copies of state information corresponding to the video set designation of the request.

18. A system for generating a plurality of video streams, the system comprising:
a scheduling network;
a sample buffer comprising one or more memory devices for the storage of samples generated in response to received graphics data;
a set of one or more state registers in the one or more memory devices; and
a filtering engine configured to filter samples for a plurality of video streams,
wherein the filtering engine sends a request for samples to be filtered to the scheduling network,
wherein the one or more memory devices are configured to format the samples prior to transmission to the filtering engine in accordance with the state information stored in the state registers, and
wherein the scheduling network is configured to:
compare a request of a designation of a video set to a previous request designation,
update one or more of the state registers in one or more of the memory devices in response to a determination that the video set designation of the request is different from the previous request designation, and
assert signals inducing a transfer of a collection of samples corresponding to the request from the one or more memory devices to the filtering engine.

* * * * *